US005269344A

United States Patent [19]
McHugh

[11] Patent Number: 5,269,344
[45] Date of Patent: Dec. 14, 1993

[54] SUPPLY VALVE AND ARRANGEMENT FOR FIRE SUPPRESSION WATER SPRINKLER SYSTEM

[75] Inventor: George J. McHugh, Broomall, Pa.

[73] Assignee: AGF Manufacturing, Inc., West Chester, Pa.

[21] Appl. No.: 752,479

[22] PCT Filed: Mar. 8, 1990

[86] PCT No.: PCT/US90/01114

§ 371 Date: Sep. 6, 1991

§ 102(e) Date: Sep. 6, 1991

Related U.S. Application Data

[63] Continuation-in-part of Ser. No. 320,716, Mar. 8, 1989, Pat. No. 4,993,453, and a continuation-in-part of Ser. No. 413,292, Sep. 27, 1989, Pat. No. 4,971,109, and a continuation-in-part of Ser. No. 416,111, Oct. 3, 1989, Pat. No. 5,036,883, and a continuation-in-part of Ser. No. 320,713, Mar. 8, 1989, Pat. No. 4,995,423, which is a continuation-in-part of Ser. No. 138,436, Dec. 28, 1987, Pat. No. 4,852,610, which is a continuation-in-part of Ser. No. 881,270, Jul. 2, 1986, Pat. No. 4,741,361, which is a continuation-in-part of Ser. No. 874,653, Jun. 16, 1986, abandoned.

[51] Int. Cl.$^5$ .................................................. F16K 37/00
[52] U.S. Cl. ...................................... 137/557; 137/559; 137/599; 251/206; 251/208; 251/315 R; 73/168; 73/861.74
[58] Field of Search ............... 137/557, 559, 599, 860; 251/206, 207, 208, 209, 315; 73/168, 861.73, 861.74, 861.75, 861.76

[56] References Cited

U.S. PATENT DOCUMENTS

| | | | |
|---|---|---|---|
| 350,510 | 10/1886 | Stretch | 73/332 |
| 421,224 | 2/1890 | Applegarth | 251/207 |
| 899,201 | 9/1908 | Braybrook | 137/551 |
| 926,774 | 7/1909 | Schmidt | 174/102 R |

(List continued on next page.)

FOREIGN PATENT DOCUMENTS

| | | |
|---|---|---|
| 963446 | 2/1975 | Canada . |
| 42304 | 8/1908 | Switzerland . |
| 110371 | 6/1925 | Switzerland . |

OTHER PUBLICATIONS

Brochure from Watts Regulator regarding Flow Switches Actuated by Liquid Flow.
Brochure from Watts Regulator regarding FSV-F Series Vane-type Waterflow Detector.
Brochure from Watts Regulator regarding FS10-F Waterflow Indicators.
Brochure from Notifier Sprinkler Equipment Group regarding WFD Vane-type Waterflow Detectors installation instructions.
Brochure from Potter Electric Signal Co. regarding VSF-SF Vane type Waterflow Switch with Retard for Small Pipe.
Advertisement from Hydrolevel Company for the New Safgard Flow Switch.
Brochure from Mueller Steam Specialty regarding Muessco Silent Check Valves.
Bulletin SL-FSGB from McDonnell & Miller-Flow Switch Application Guide Book.
Brochure from Milwaukee Valve Company, Inc. regarding Butterball Butterfly Valves-BB-SCS01.
Brochure from Milwaukee Valve Company, Inc. regarding Butterball Butterfly Valves-BBMSCS & BBMSC100.
Brochure from Milwaukee Valve Company, Inc. re- (List continued on next page.)

Primary Examiner—John Rivell
Attorney, Agent, or Firm—Burns, Doane, Swecker & Mathis

[57] ABSTRACT

A supply valve and an arrangement for supplying, testing and draining a fire suppression water sprinkler system includes a supply valve which has a valve member with at least first, second and third ports. The selective rotation of the valve member varies communication between the inlet of the valve and one or more outlets for the valve. A sensor for detecting a flow of water through the supply valve is provided within valve member and has a member which is generally aligned with a turning axis of the valve member. The flow sensor arrangement may be provided in a valve of general utility.

82 Claims, 23 Drawing Sheets

U.S. PATENT DOCUMENTS

| | | | |
|---|---|---|---|
| 1,017,292 | 2/1912 | Hyde | 251/207 |
| 1,023,104 | 4/1912 | Carpenter | 251/207 |
| 1,056,344 | 3/1913 | Lester | 251/207 |
| 1,229,038 | 6/1917 | Cornelius | 251/207 |
| 1,264,775 | 4/1918 | Coles | 251/207 |
| 1,333,048 | 3/1920 | Webster | 251/207 |
| 1,428,744 | 9/1922 | Bastian et al. | 137/625.46 |
| 1,666,918 | 5/1927 | Scoville | 184/96 |
| 1,757,237 | 5/1930 | Deutsch | 73/332 |
| 1,808,092 | 6/1931 | Wimmer | 137/551 |
| 1,825,512 | 9/1931 | Durham et al. | 251/207 |
| 2,014,042 | 9/1935 | Fox | 200/81.9 R |
| 2,347,830 | 5/1944 | Kiburz et al. | 200/81.9 R X |
| 2,491,361 | 12/1949 | Burdick | 251/310 |
| 2,621,012 | 12/1952 | Graham | 251/207 |
| 2,660,560 | 11/1953 | Pickard | 137/559 |
| 2,859,611 | 11/1958 | Morse | 73/168 |
| 3,016,062 | 1/1962 | Zinniger | 136/270 |
| 3,021,869 | 2/1962 | Ross | 137/625.47 |
| 3,052,445 | 9/1962 | Kessler | 251/309 |
| 3,072,059 | 1/1963 | Heffel | 200/81.9 R X |
| 3,131,716 | 5/1964 | Griswold et al. | 137/559 |
| 3,134,405 | 5/1964 | White et al. | 251/207 |
| 3,139,907 | 7/1964 | Jones | 137/625.47 |
| 3,148,254 | 9/1964 | Clason | 208/81.9 R |
| 3,148,695 | 9/1964 | Groen, Jr. et al. | 251/315 |
| 3,228,652 | 1/1966 | Antrim | 137/860 X |
| 3,233,865 | 2/1966 | Panzica et al. | 251/309 |
| 3,251,419 | 5/1966 | Howard | 137/625.47 |
| 3,273,595 | 9/1966 | Novak | 137/637.4 |
| 3,308,850 | 3/1967 | Gill | 251/315 X |
| 3,314,643 | 4/1967 | Sachnik | 251/309 |
| 3,344,247 | 9/1967 | Kmiecik | 200/81.9 |
| 3,345,032 | 10/1967 | Rawstron | 251/315 |
| 3,347,516 | 10/1967 | Linde | 251/160 |
| 3,354,715 | 11/1967 | Wiebe et al. | 73/198 |
| 3,360,621 | 12/1967 | Liddell | 200/81.9 M |
| 3,379,410 | 4/1968 | Stewart, Jr. | 137/860 X |
| 3,385,318 | 5/1968 | Kilbourn | 137/557 |
| 3,386,461 | 6/1968 | Fisher | 251/207 |
| 3,517,554 | 6/1970 | Smith | 73/332 |
| 3,525,363 | 8/1970 | Gore et al. | 137/625.47 |
| 3,567,176 | 3/1971 | Johnson | 251/174 |
| 3,604,631 | 9/1971 | Etter | 239/414 |
| 3,674,238 | 7/1972 | Pickles et al. | 251/309 |
| 3,817,097 | 6/1974 | Heroux | 73/168 |
| 3,854,497 | 12/1974 | Rosenberg | 137/557 |
| 3,939,871 | 2/1976 | Dickson | 137/625.47 |
| 3,986,397 | 10/1976 | Perreault | 73/193 R |
| 4,108,207 | 8/1978 | Doody | 137/625 |
| 4,130,128 | 12/1978 | Kaneko | 251/207 |
| 4,143,255 | 3/1979 | Herscovitz | 200/81.9 M |
| 4,177,832 | 12/1979 | Price | 251/315 |
| 4,208,033 | 6/1980 | Kesterman | 137/385 X |
| 4,244,393 | 1/1981 | Lehtinen | 137/559 |
| 4,273,152 | 6/1981 | Freeman | 251/315 |
| 4,399,977 | 8/1983 | Wheatley | 251/315 |
| 4,643,224 | 2/1987 | Rung | 137/559 |
| 4,655,078 | 4/1987 | Johnson | 73/168 |
| 4,657,222 | 4/1987 | Tuillo | 251/309 X |
| 4,704,983 | 11/1987 | Rung | 116/276 |
| 4,729,403 | 3/1988 | Roche | 137/559 |
| 4,739,794 | 4/1988 | Ballun | 137/599 |
| 4,782,333 | 11/1988 | Merchant | 137/559 X |
| 4,796,858 | 1/1989 | Kabel | 137/860 X |
| 4,848,401 | 7/1989 | Devilleger et al. | 137/599 |

OTHER PUBLICATIONS garding Butterball Butterfly Valves-BB-SC100, BBVSC100, BB-SCS, BBVSCS and BB-SCK.

Brochure from Milwaukee Valve Company, Inc. regarding Butterball Butterfly Valves-BBHSC100, BVHSC100, BBHSCS, BVHSCS and BB-SCK.

Brochure from Milwaukee Valve Company, Inc. regarding Butterball Butterfly Valves-Hi-Rise Sprinkler Valves.

Brochure from Watts Regulator regarding Series B-6800.

Brochure from Grinnell Corporation regarding Waterflow Detectors, Models VSR-D & VSR-T.

Brochure from Triple "R" Specialty Co. dated Nov. 1986.

Brochure from Fire Sprinkler Fittings Co. dated Aug. 1986.

"Standard for the Installation of Sprinkler Systems", NFPA 13, 1983 Edition, pp. 13-135.

Brochure from Victaulic dated Jun. 1986.

Brochure from Sunbelt Marketing, Inc. dated Apr. 15, 1986.

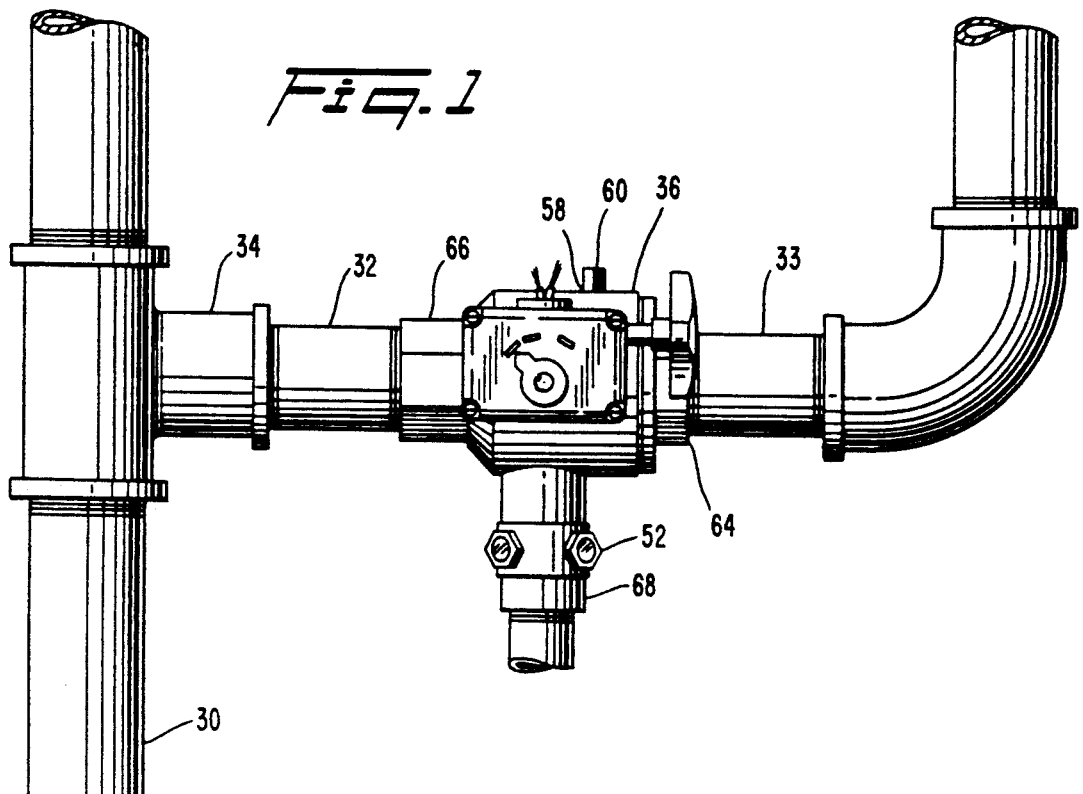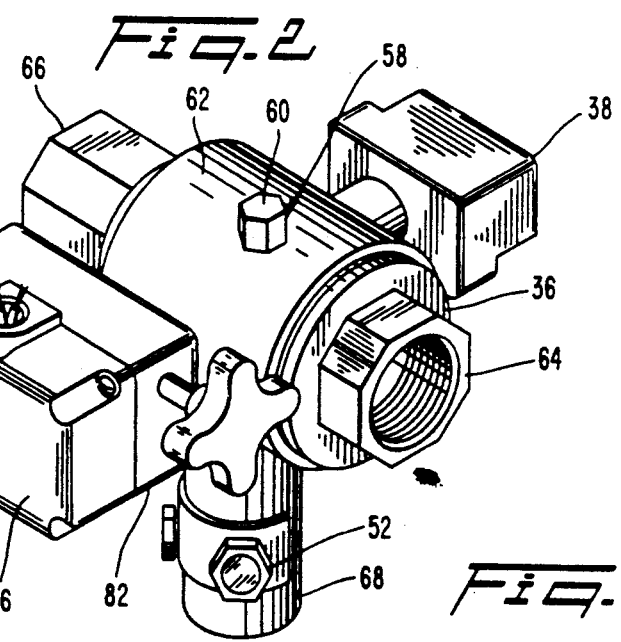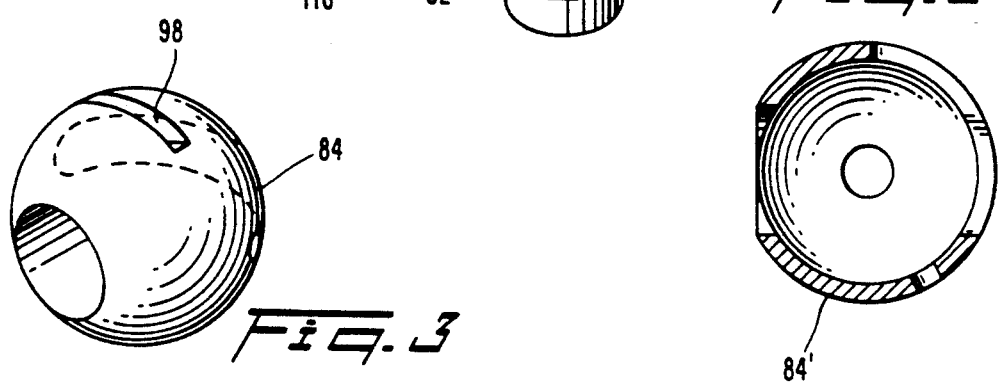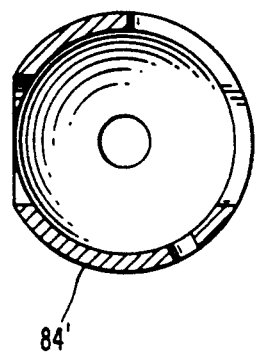

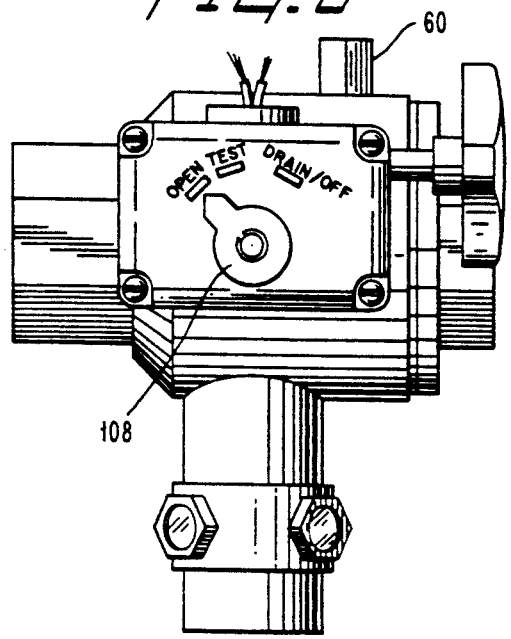
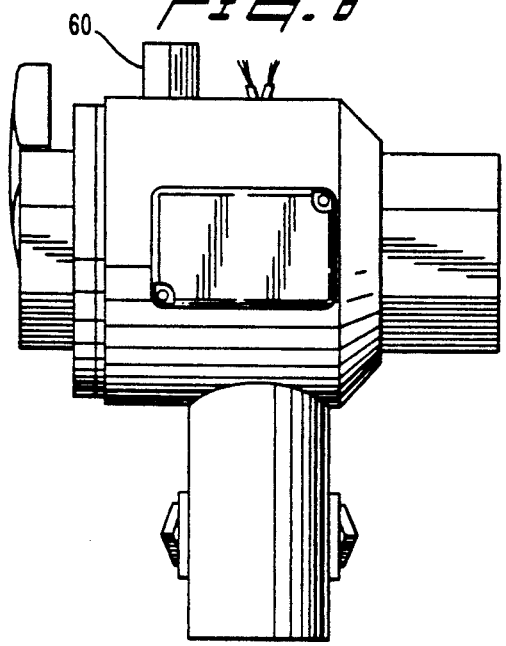
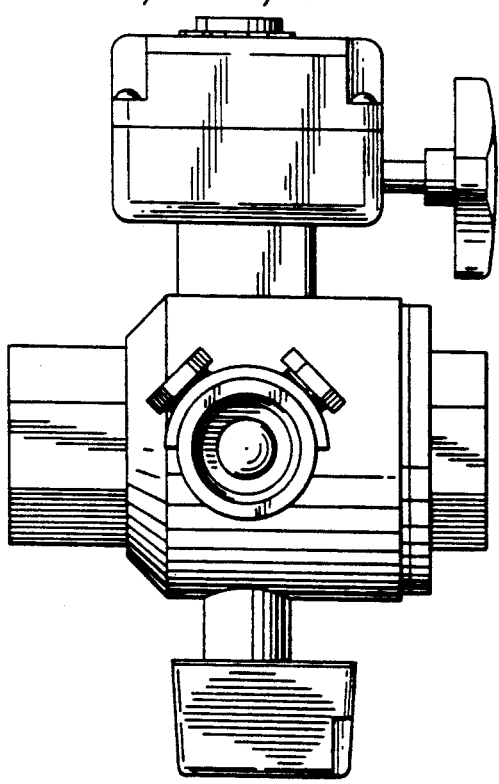
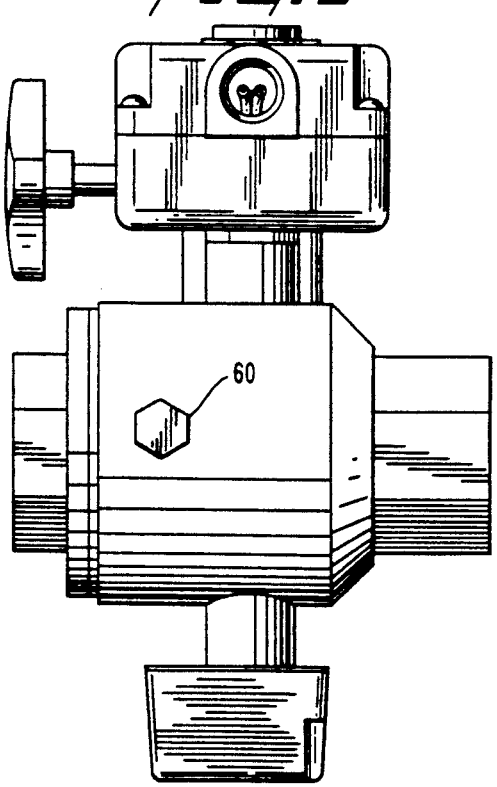

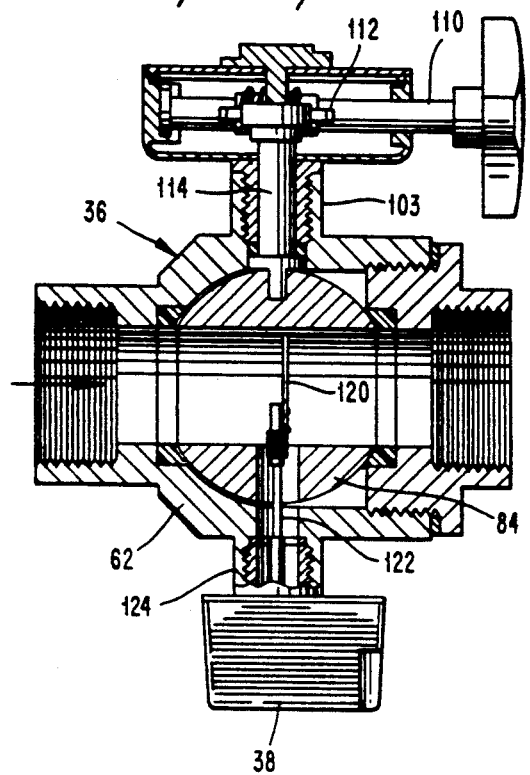
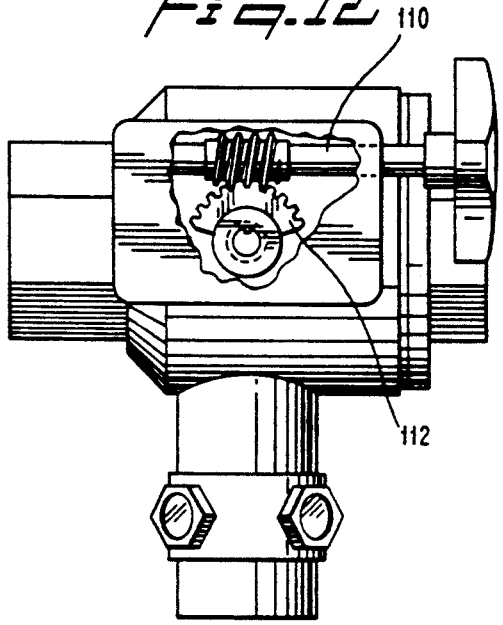
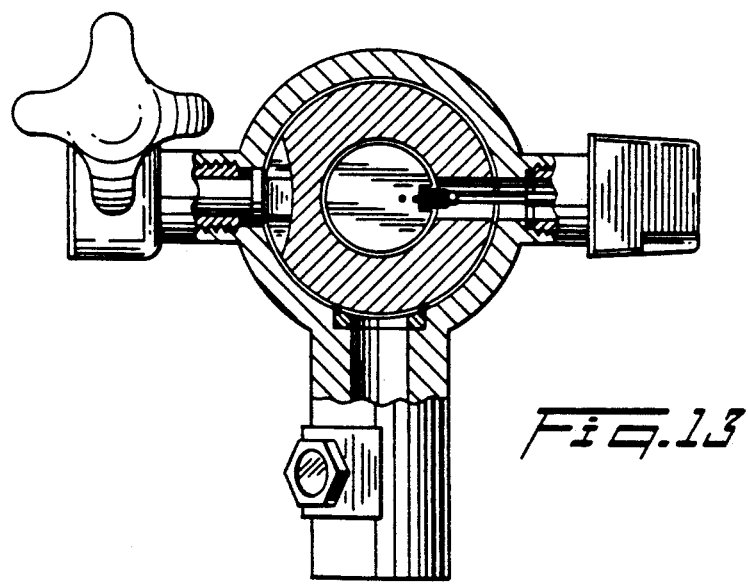

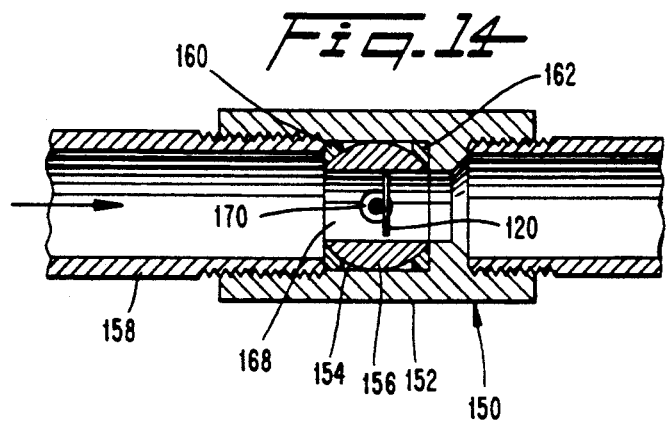
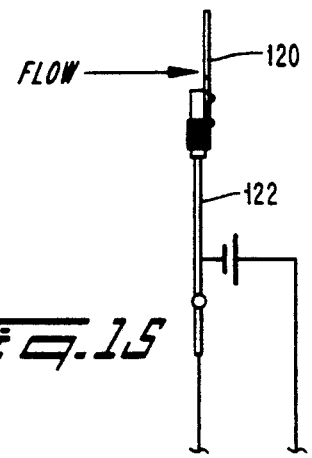
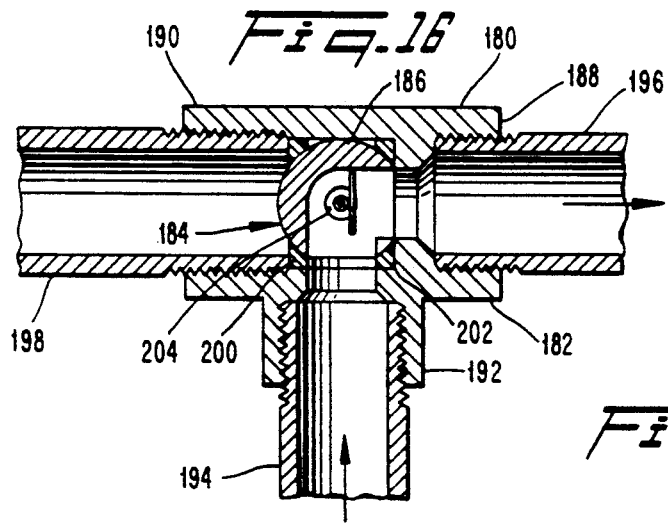
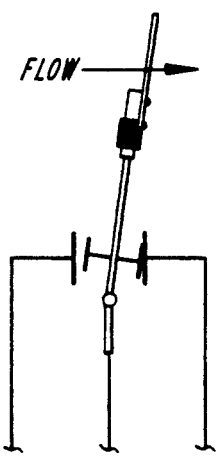
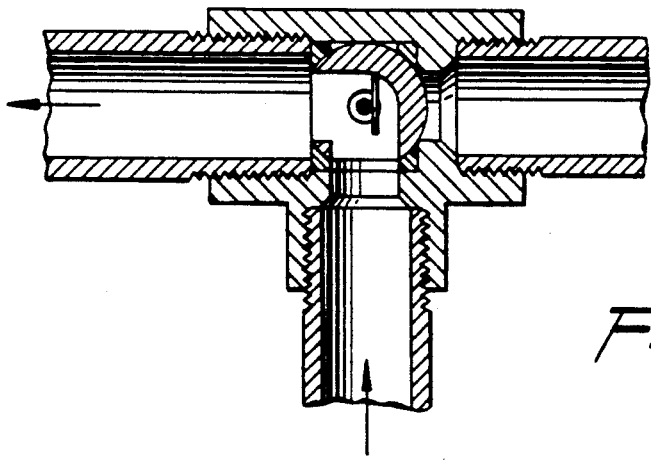
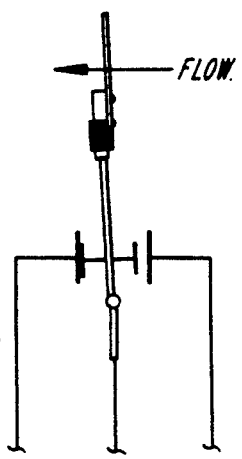

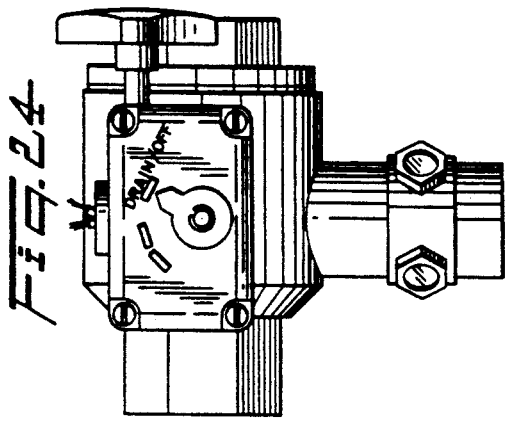
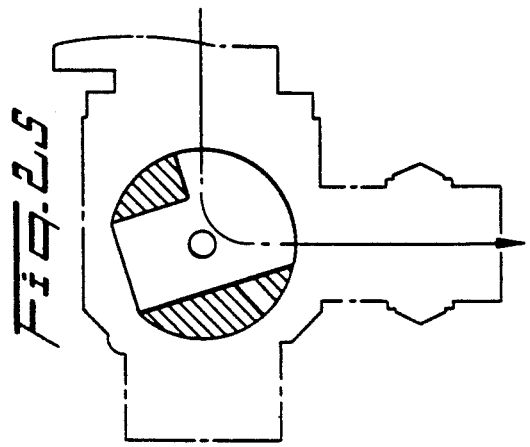
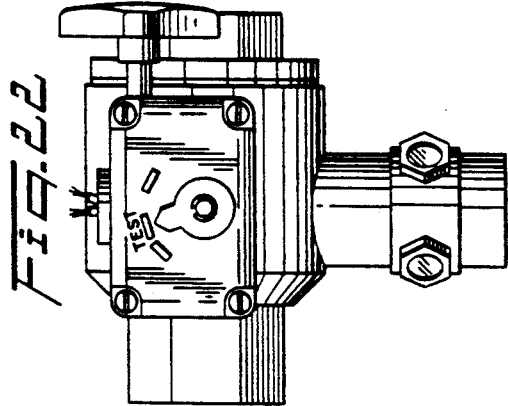
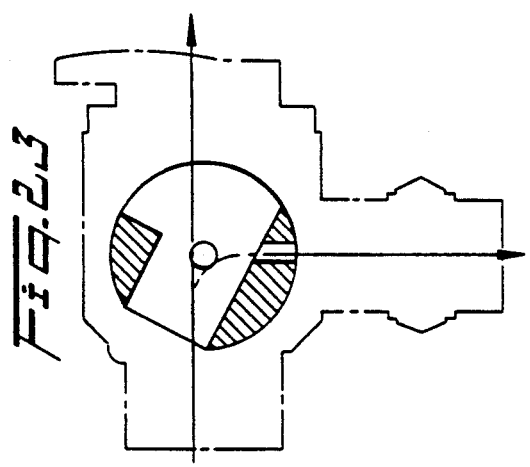
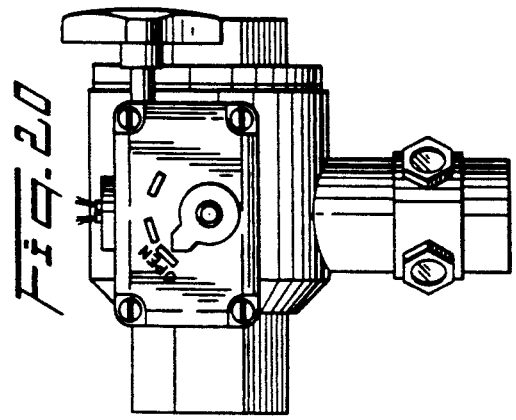
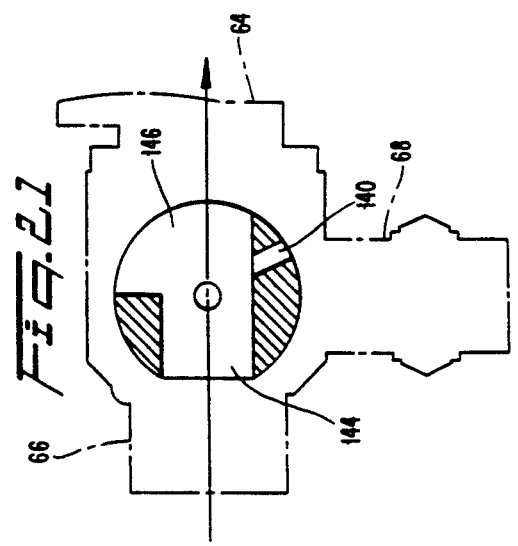

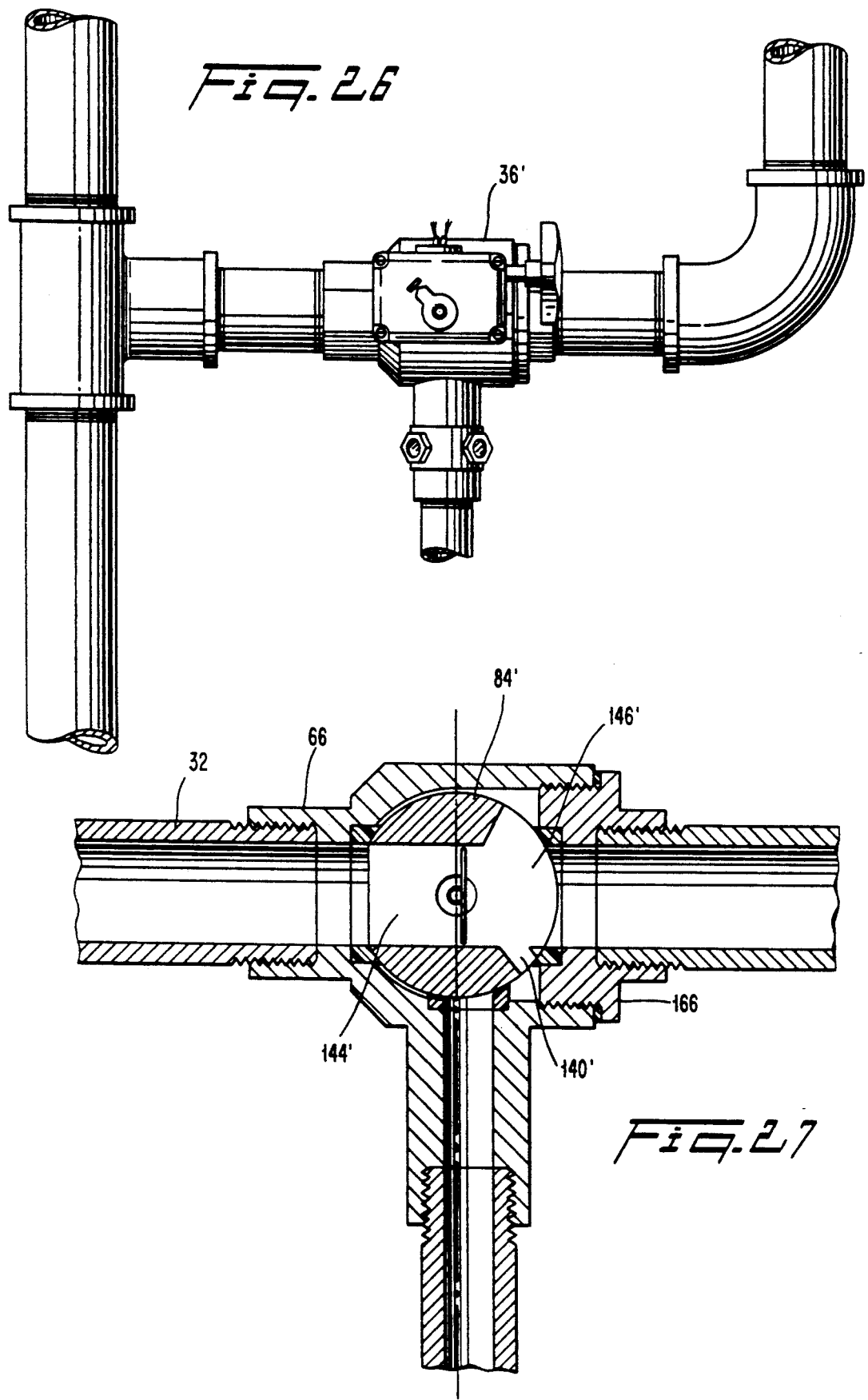

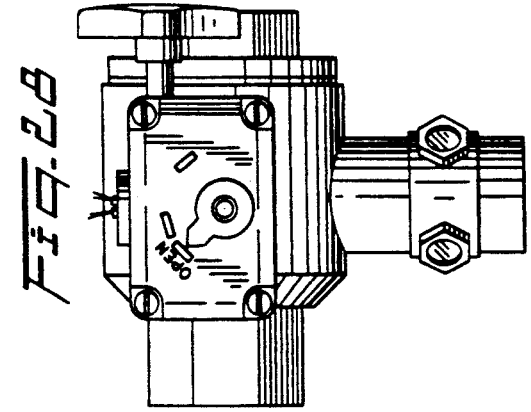
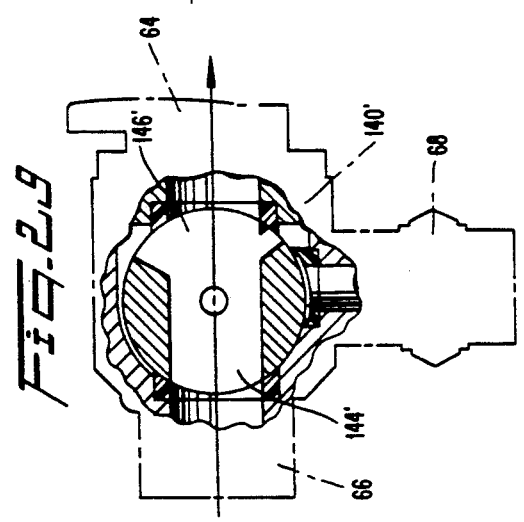
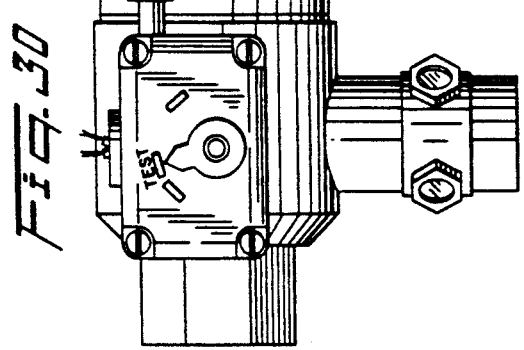
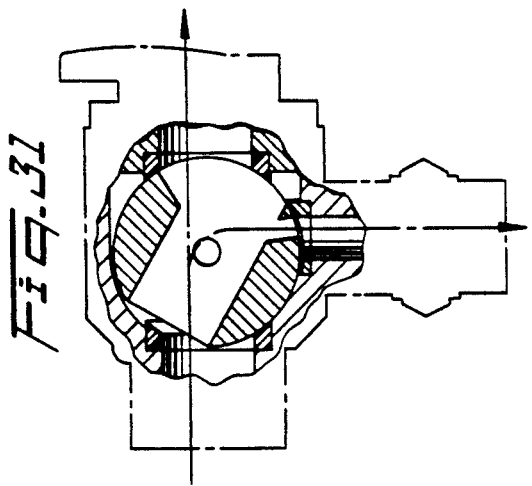
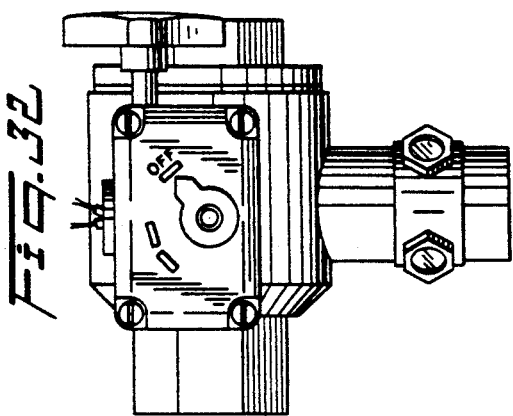
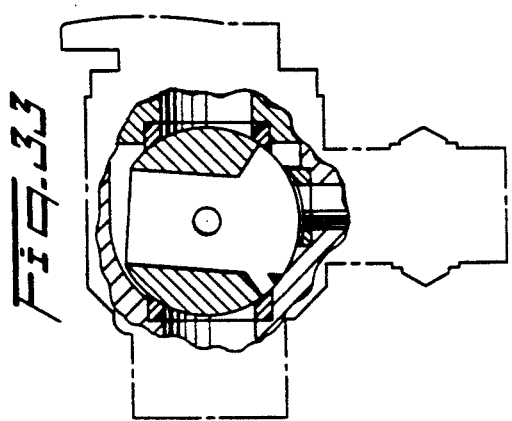

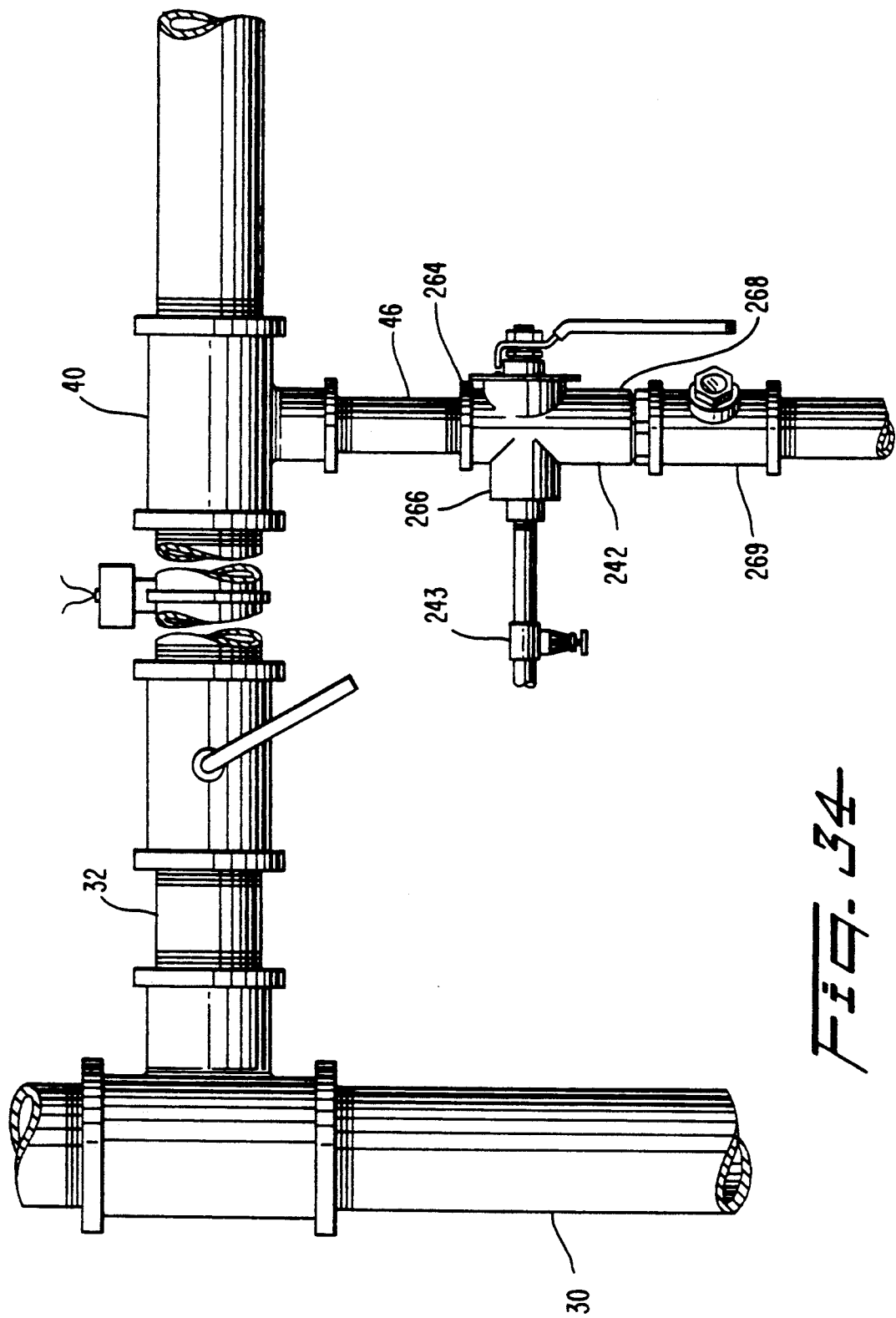

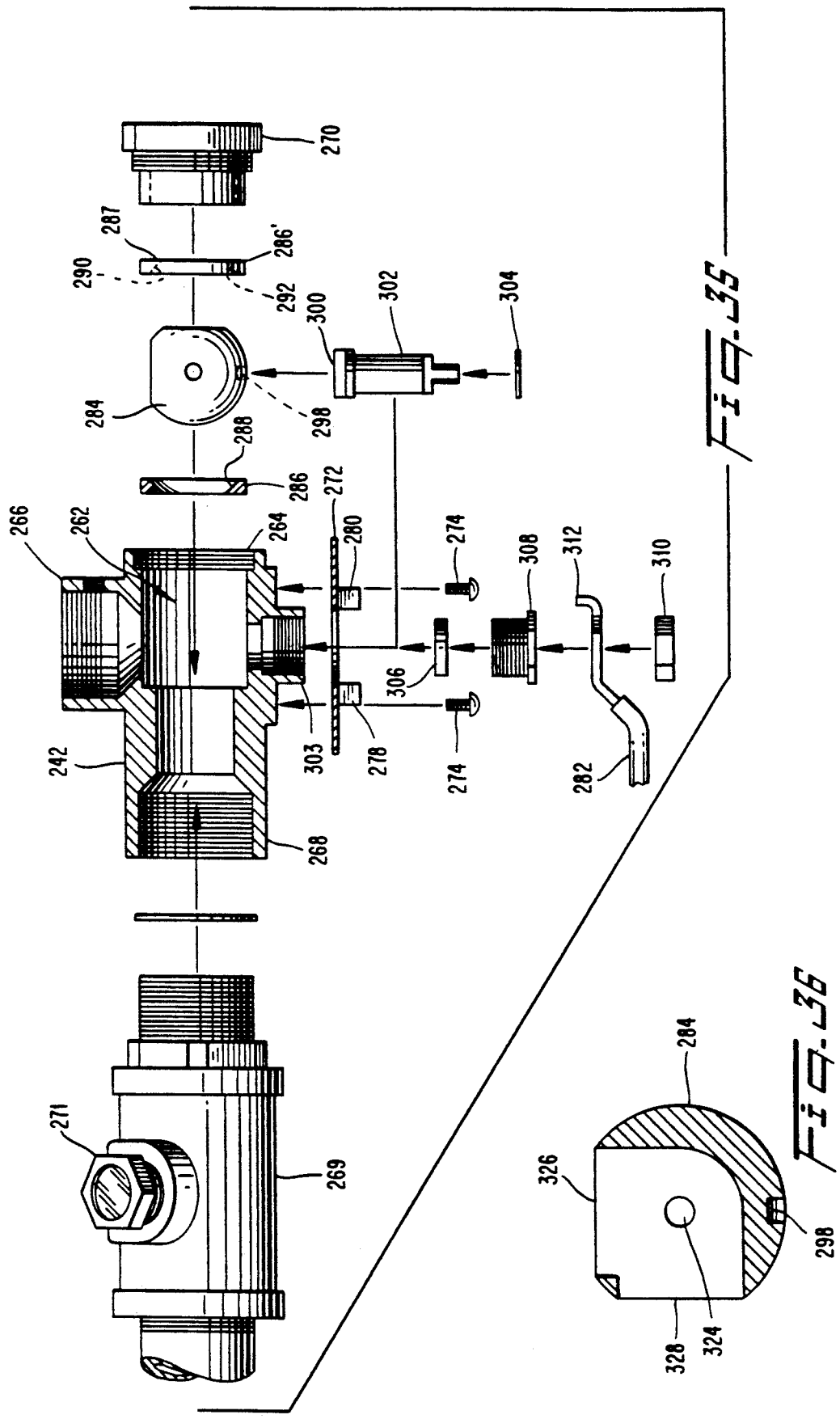

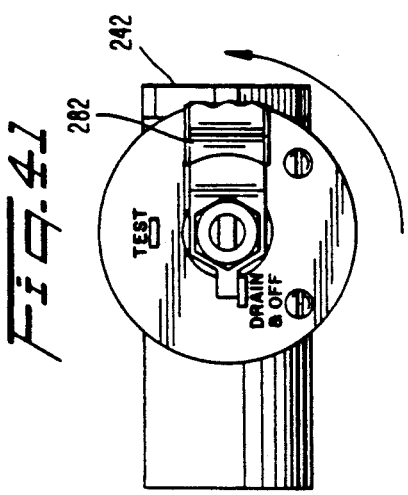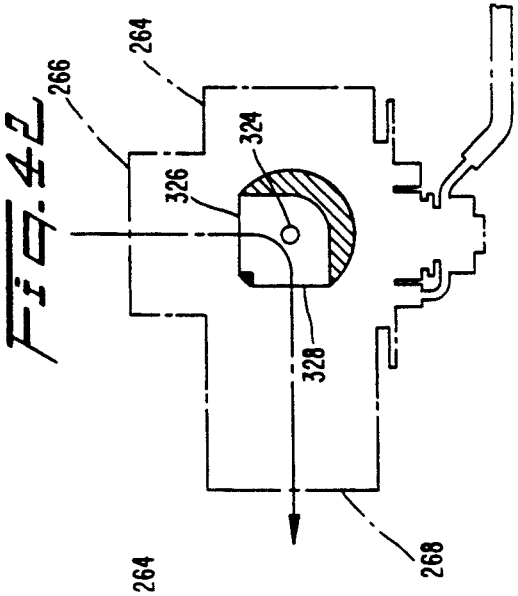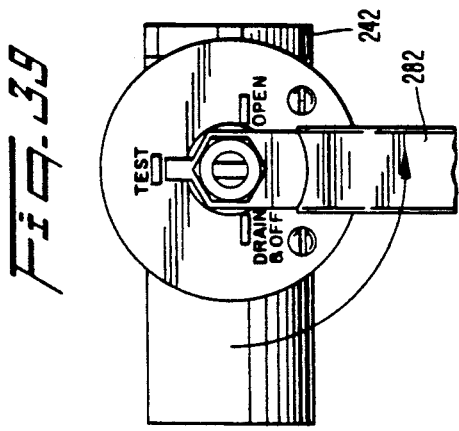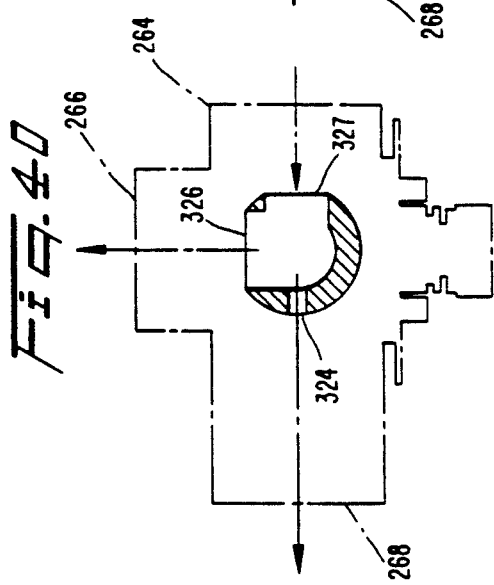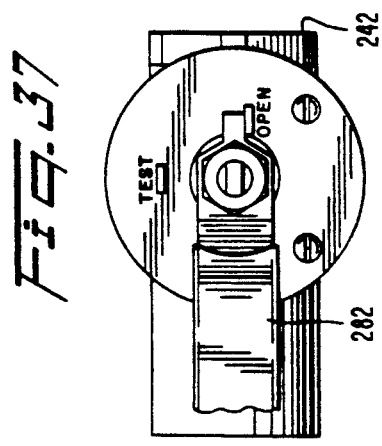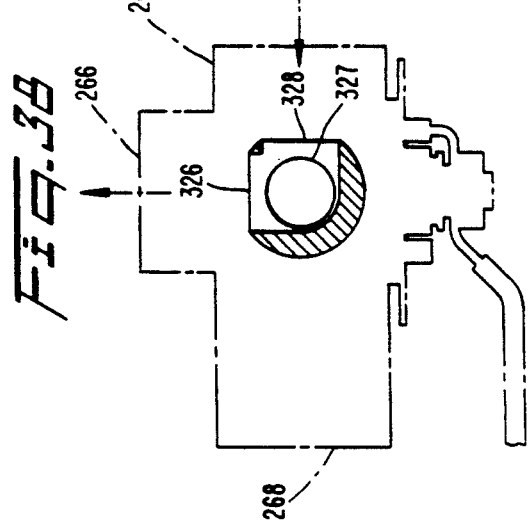

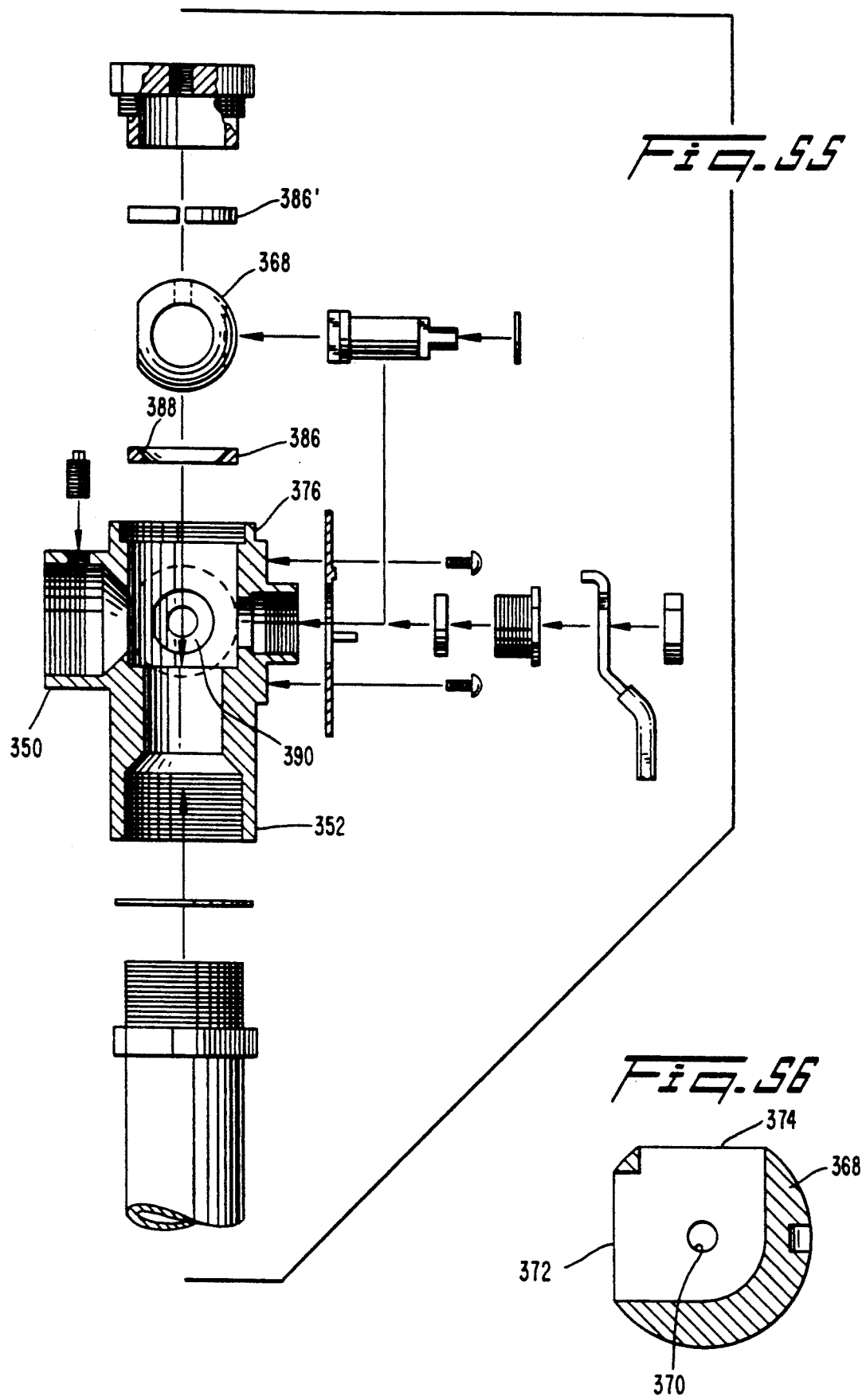

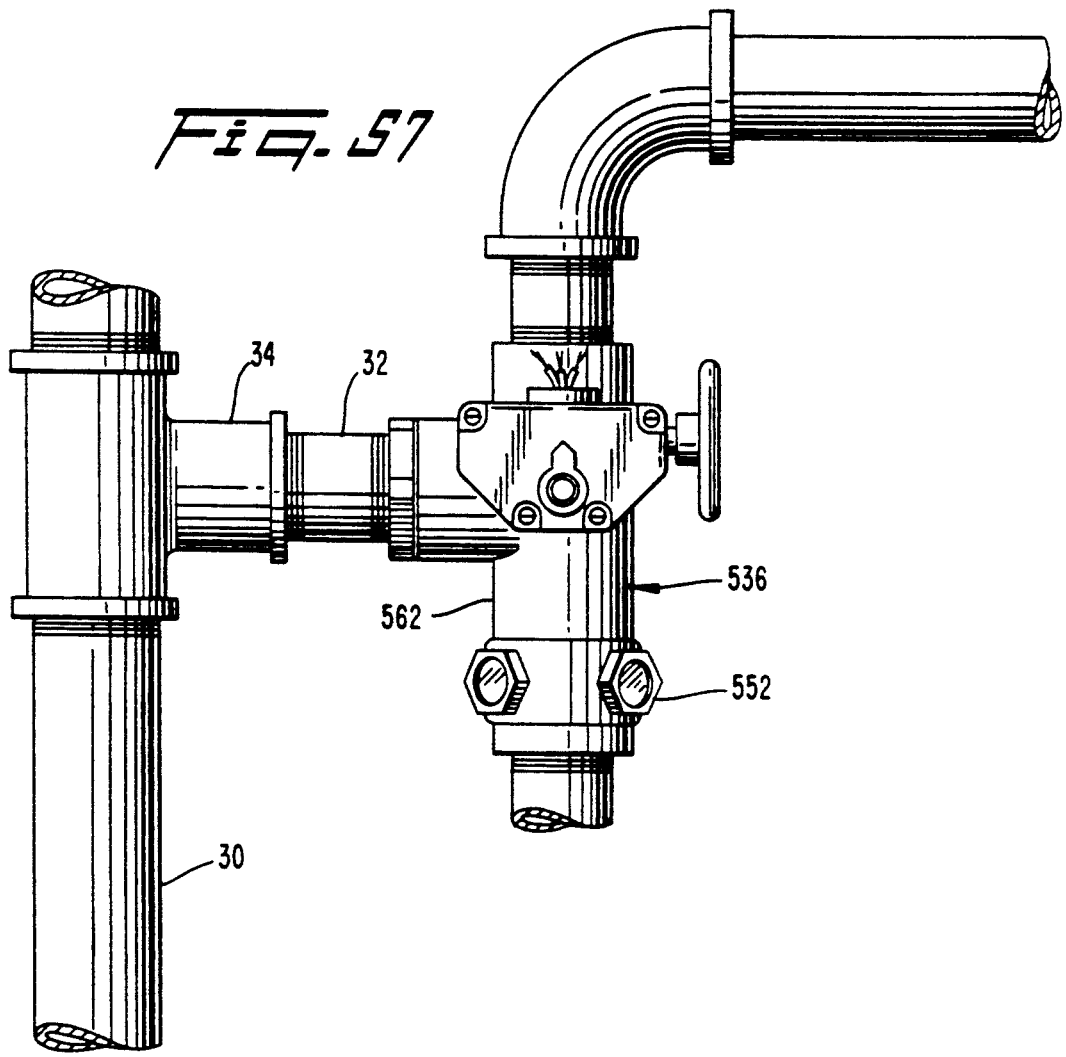

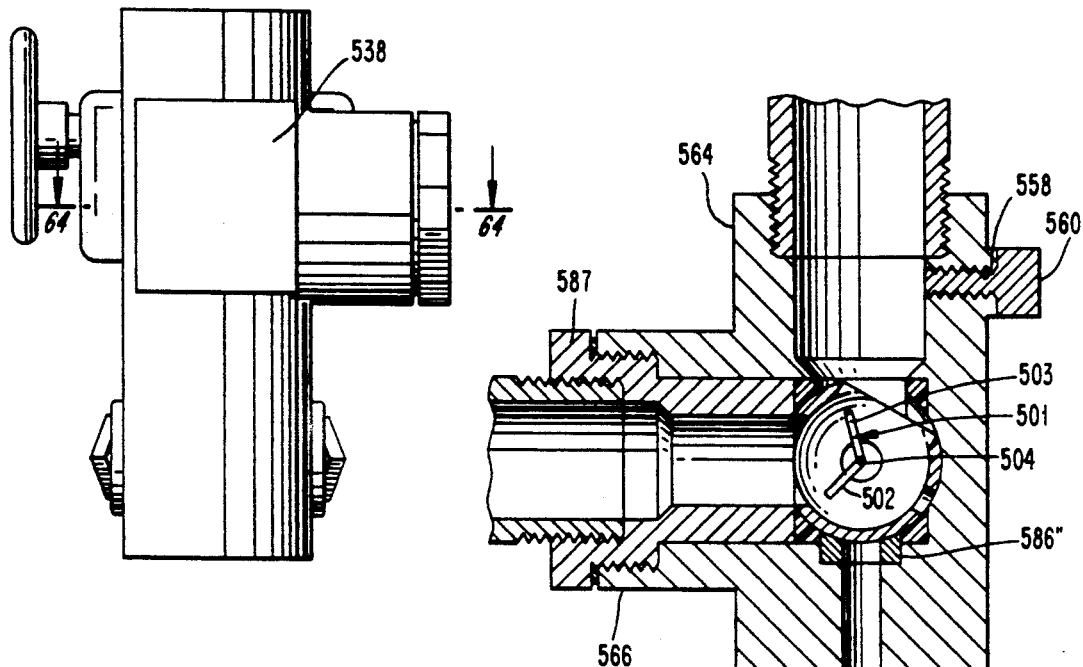
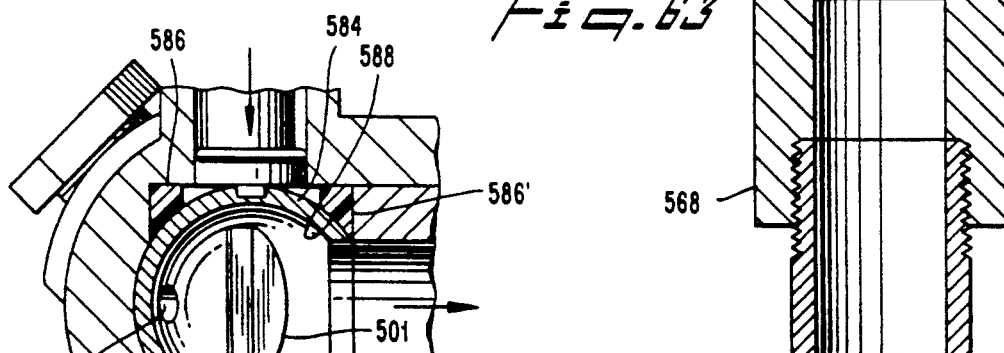
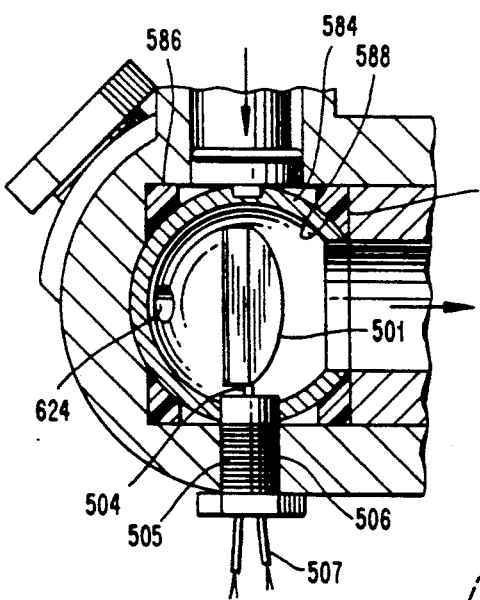
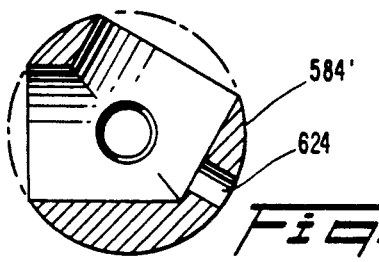

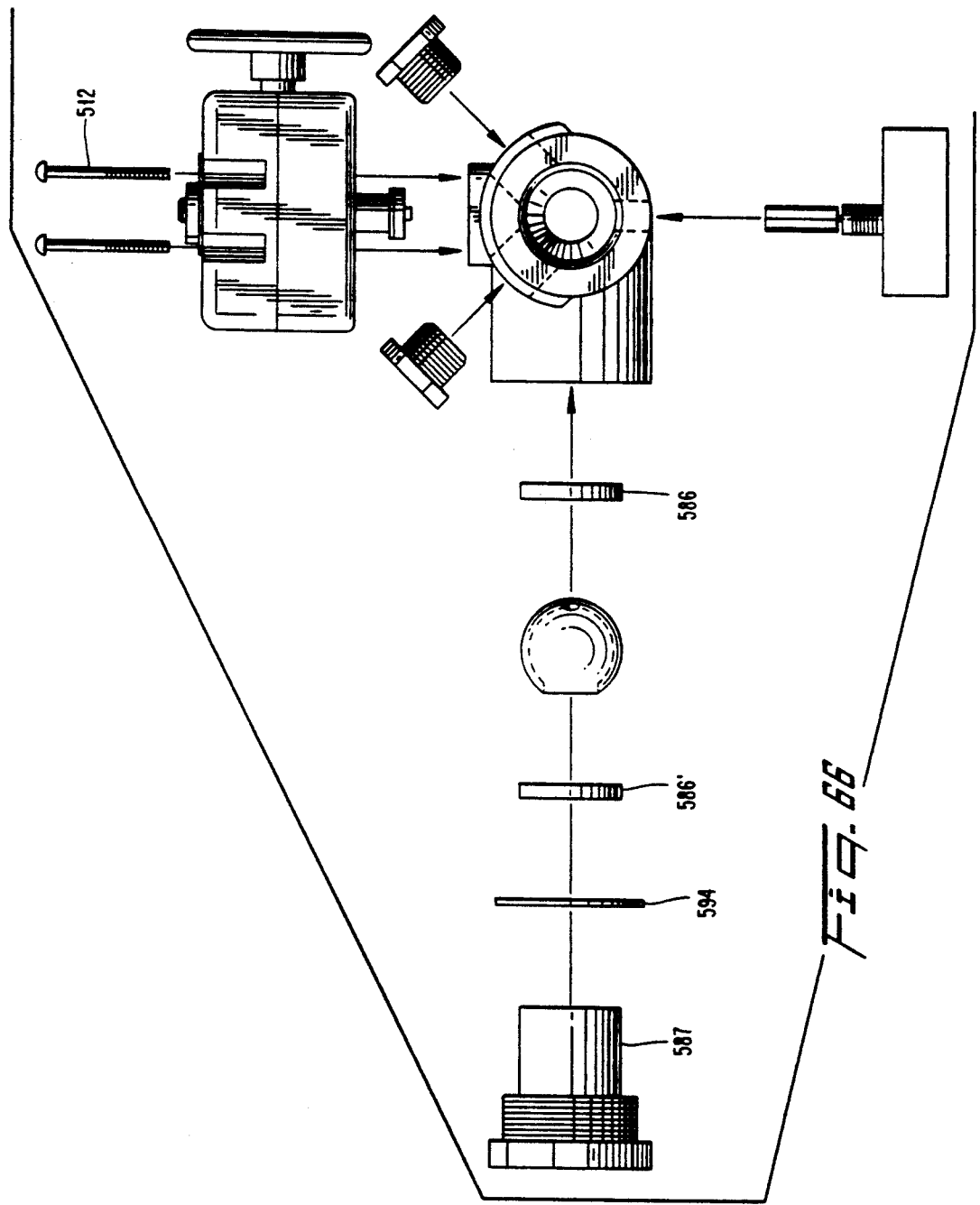

SUPPLY VALVE AND ARRANGEMENT FOR FIRE SUPPRESSION WATER SPRINKLER SYSTEM

This application is a continuation-in-part application of my copending application entitled Valve and Arrangement for Fire Suppression Water Sprinkler System, Ser. No. 320,716, filed on Mar. 8, 1989, now U.S. Pat. No. 4,993,453, and is also a continuation-in-part application of my copending application entitled Valve and Arrangement for Fire Suppression Water System, Ser. No. 413,292, filed on Sep. 27, 1989, now U.S. Pat. No. 4,971,109, and is also a continuation-in-part application of my copending application entitled Valve and Arrangement for Fire Suppression Water Sprinkler System, Ser. No. 416,111, filed on Oct. 3, 1989, now U.S. Pat. No. 5,036,883, and is also a continuation-in-part application of my copending application entitled Valve and Arrangement for Fire Suppression Water Sprinkler System, Ser. No. 320,713, filed on Mar. 8, 1989, now U.S. pat. No. 4,995,423, which is a continuation-in-part application of application Ser. No. 138,436, filed on Dec. 28, 1987, now issued as U.S. Pat. No. 4,852,610 which is in turn a continuation-in-part application of application Ser. No. 881,270, filed on Jul. 2, 1986, now issued as U.S. Pat. No. 4,741,361 which in turn is a continuation-in-part application of my application of the same title, Ser. No. 874,653, filed on Jun. 16, 1986, now abandoned, each of which is incorporated herein by reference.

BACKGROUND AND SUMMARY OF THE PRESENT INVENTION

The present invention relates generally to valves and more particularly relates to valve arrangements for use in supplying water to fire suppression systems and for use in testing and draining fire suppression water sprinkler systems. The present invention also relates generally to flow switches and more particularly relates to flow switches used in connection with fire suppression water sprinkler systems.

In a typical fire suppression water sprinkler system as installed in many buildings, an array of individual fire sprinklers is supplied with water through a main conduit and various branch conduits. The individual fire sprinklers are generally provided with a member that melts when the ambient temperature reaches a predetermined level indicative of a fire. The melting of the member opens a fire sprinkler to spray water in order to suppress the fire. The individual fire sprinklers are provided with meltable members so that the spray of water will hopefully be limited to the region of the building where the fire is present. In this way, the extent of water damage may be minimized.

After a fire, and especially during maintenance and renovation, it may become necessary to replace one or more of the individual water sprinklers. At such times it is desirable to be able to drain the system of water conduits, so that the removal of one or more of the individual water sprinklers (after the supply of water to the main conduit has been turned off) will not result in a flow of water through the fitting for the water sprinkler. Accordingly, it is conventional in the art to provide a valve which when opened will drain the water conduits of the system downstream of the main conduit.

Such fire suppression systems also oftentimes have a switch or sensor that detects the flow of water in the conduits to indicate that even only one of the individual water sprinklers has opened. Since the flow of water in the conduits generally means that a fire is present in the building, the switch or sensor typically triggers a fire alarm or sends an appropriate signal directly to a fire department. Therefore, many fire codes require, and it is otherwise desirable, that the switch or sensor which detects the flow of water in the conduits be periodically tested. Accordingly, it has also become conventional in the art to provide a valve which enables the system to be tested by permitting a flow of water corresponding to the flow through only one individual water sprinkler that has been opened.

In addition, it is desirable (and sometimes required by the applicable fire code) to be able to visually observe the flow of water from the testing valve. Since the testing valve (and oftentimes the drainage valve) is frequently connected directly to a drain pipe, it is conventional to provide a sight glass downstream of the testing valve (and sometimes downstream of the drainage valve). It is, of course, possible to alternatively place a sight glass upstream of the testing valve. Also, since it is typically desirable to determine the pressure of the water upstream of the testing valve, prior to and during a test operation, it is conventional to provide a fitting or port to receive a pressure gauge upstream of the testing valve.

The use of a separate supply valve and a separate testing and drainage valve results in significant time and expense during installation which can be obviated by the present invention.

Likewise, the use of a separate flow sensor typically downstream of the supply valve (especially together with a separate testing and drainage valve) in a fire suppression water sprinkler system results in significant time and expense during installation which can be minimized by the present invention. Moreover, to provide a flow sensor generally in a conduit results in additional time and expense due to the expense of an appropriate fitting and the need to install the fitting in the conduit which can be minimized by the present invention.

Accordingly, it is an object of the present invention to provide a supply valve and arrangement for a fire suppression water sprinkler system which overcomes the disadvantages of the prior art.

Yet another object of the present invention is to provide an arrangement for supplying water to a fire suppression water sprinkler system and for testing and draining a fire suppression water sprinkler system which is relatively simple and easy to install and use.

Still another object of the present invention is to provide an arrangement for supplying water to a fire suppression water sprinkler system and for testing and draining a fire suppression water sprinkler system which is relatively inexpensive.

Yet still another object of the present invention is to provide a supply valve which permits a fire suppression water sprinkler system to be tested and drained.

A still further object of the present invention is to provide a supply valve which has two outlets and which provides two different flow rates of fluid through one of the outlets of the valve.

An additional object of the invention is to provide an arrangement which permits an easy observation of the flow of water through the valve.

Yet another object of the invention is to provide a supply valve for a fire suppression water sprinkler system which includes a flow sensor to indicate a flow of water through the valve.

Yet still another object of the present invention is to provide a valve and flow switch arrangement which is relatively inexpensive to build and to install.

The supply valve and arrangement according to the present invention comprises a main conduit which supplies water to a plurality of water sprinklers. The supply valve has a housing which defines an interior chamber with an inlet and at least two outlets. A supply valve member provided within the interior chamber has a turning axis and at least first, second, and third ports arranged about the periphery of the supply valve member. At least one of the first, second, and third ports has a size which is different than the other two ports. A moving member selectively moves the valve member within the interior chamber, whereby communication between the inlet and each of the two outlets of the valve may be changed.

In a preferred embodiment of the present invention, the inlet of the valve may be connected to a first outlet to supply water at a first preselected flow rate to a plurality of sprinkler heads with the second outlet being closed. The inlet of the valve may also be selectively connected to the second outlet through the first port which has a size different than the second and third ports to test the system by providing a flow through the second outlet at a second preselected flow rate smaller than the first. The inlet may also be closed with the two outlets of the supply valve being in communication with one another to drain the fire suppression system.

In this way, the supply valve may be sequentially fully opened through a first outlet to supply the plurality of sprinkler heads at a first preselected flow rate, opened through a second outlet at a second preselected flow rate to test the system and then the inlet may be closed and the two outlets placed in communication with one another to drain the system.

In another preferred embodiment of the present invention, a supply value has a housing which defines an interior chamber with an inlet and at least two outlets. A supply valve member provided within the interior chamber has a turning axis and at least first, second, and third ports arranged about the periphery of the supply valve member. At least the first port has a size which is different than the second and third ports. A moving member selectively moves the valve member within the interior chamber, whereby communication between the inlet and each of the two outlets of the supply valve may be changed.

In this embodiment of the present invention, the inlet of the supply valve may be connected to a first outlet at a first, fully open, preselected flow rate. The inlet of the supply valve may also be selectively connected to the second outlet through the first port which has a size different than the second and third ports to supply the second outlet at a second preselected flow rate smaller than the first preselected flow rate. Both the inlet and the first outlet may also be closed to prevent communication between the inlet and either of the two outlets and between the first and second outlets.

In this way, the supply valve may be sequentially fully opened through a first outlet at a first preselected flow rate, opened through a second outlet at a second preselected flow rate to test the system and then the inlet may be closed and first outlet may be closed.

In another preferred embodiment of the present invention, a supply valve has a housing which defines an interior chamber with an inlet and at least two outlets. A supply valve member provided within the interior chamber has a turning axis and at least first, second, and third ports arranged about the periphery of the supply valve member. At least the first port has a size which is different than the second and third ports. A moving member selectively moves the valve member within the interior chamber, whereby communication between the inlet and each of the two outlets of the supply valve may be changed.

In this embodiment of the present invention, the inlet of the supply valve may be connected to a first outlet at a first, fully open, preselected flow rate. The inlet of the supply valve may also be selectively connected to the second outlet through the first port which has a size different than the second and third ports to supply the second outlet at a second preselected flow rate smaller than the first preselected flow rate. Both the first outlet and the second outlet may be closed to prevent communication between the inlet and either of the two outlets.

In this way, the supply valve may be closed, may be fully opened through the first outlet at a first preselected flow rate, and opened through a second outlet at a second preselected flow rate to test the system.

Additionally, in any of these embodiments, as desired, a sight glass housing may be provided, either as a unitary portion of the valve housing or as a separate element, which preferably presents two sight glasses at a substantially 90 degree angle to one another so as to simplify the task of determining whether water is flowing through the second outlet past the sight glass housing. For example, by providing two sight glasses, light is permitted to enter one of the glasses at an angle to the line of vision through the other sight glass so as to illuminate the interior of the sight glass housing.

Where appropriate or where required by regulation, the supply valve and arrangement according to the present invention may preferably be provided with a slowly closing actuator so that the valve member may not be moved from a closed position to an open position in less than a predetermined number of seconds. In addition, a tamper switch indicator may be provided for the supply valve and arrangement, as desired or as required.

The supply valve and arrangement according to the present invention may also include an integral flow switch. In the embodiments where the turning axis of the valve actuator does not pass through the inlet or through either of the outlets of the valve, the flow switch is preferably provided generally opposite to and aligned with the axis of the valve actuator.

In another preferred embodiment of the present invention, a valve of general application is provided with an integral flow switch. Preferably, the valve includes a ball valve member with a valve actuator which does not pass through an inlet or an outlet of the valve housing. In such an arrangement, the flow switch is provided within the central cavity of the ball valve member and is positioned generally opposite to the valve actuator and aligned with the valve actuator or handle.

BRIEF DESCRIPTION OF THE DRAWINGS

Preferred embodiments of the present invention will be described in greater detail with reference to the accompanying drawings, wherein like members bear like reference numerals and wherein:

FIG. 1 is a front view of an arrangement for supplying, testing, and draining a fire suppression water sprinkler system according to the present invention;

FIG. 2 is a pictorial view of a supply valve according to the present invention;

FIG. 3 is a pictorial view of a valve member of the valve of FIG. 10;

FIG. 4 is a cross sectional view of another valve member suitable for use in the valve of FIG. 10;

FIG. 5 is a front view of the supply valve of FIG. 2;

FIG. 6 is rear view of the supply valve of FIG. 2;

FIG. 7 is a bottom view of the supply valve of FIG. 2;

FIG. 8 is a top view of the supply valve of FIG. 2;

FIG. 11 is a cross sectional view of another supply valve according to the present invention;

FIG. 12 is a front view in partial cross-section of the supply valve of FIG. 11;

FIG. 13 is a side view in partial cross-section of the supply valve of FIG. 11;

FIG. 14 is a cross-sectional view of a valve and flow switch according to the present invention;

FIG. 15 is a schematic view of the flow switch in the valve of FIG. 14;

FIG. 16 is a cross-sectional view of a three way ball valve and flow switch according to the present invention;

FIG. 17 is a schematic view of the flow switch in the valve of FIG. 16;

FIG. 18 is a cross-sectional view of the three way valve of FIG. 16 with the flow directed to another outlet of the valve;

FIG. 19 is a schematic view of the flow switch in the valve of FIG. 18;

FIG. 20 is a front view of the valve of FIG. 2 in the "open" configuration;

FIG. 21 is a schematic view of the valve of FIG. 20 in the "open" configuration;

FIG. 22 is a front view of the valve of FIG. 2 in the "test" configuration;

FIG. 23 is a schematic view of the valve of FIG. 22 in the "test" configuration;

FIG. 24 is a front view of the valve of FIG. 2 in the "drain & off" configuration;

FIG. 25 is a schematic view of the valve of FIG. 24 in the "drain & off" configuration;

FIG. 26 is a front view of another arrangement for supplying, testing, and draining a fire suppression water sprinkler system according to the present invention;

FIG. 27 is a cross-sectional view of the supply valve of FIG. 26;

FIG. 28 is a front view of the valve of FIG. 27 in the "open" configuration;

FIG. 29 is a schematic view of the valve of FIG. 28 in the "open" configuration;

FIG. 30 is a front view of the valve of FIG. 27 in the "test" configuration;

FIG. 31 is a schematic view of the valve of FIG. 30 in the "test" configuration;

FIG. 32 is a front view of the valve of FIG. 27 in the "off" configuration;

FIG. 33 is a schematic view of the valve of FIG. 32 in the "off" configuration;

FIG. 34 is a front view of another arrangement for supplying, testing, and draining a fire suppression water sprinkler system according to the present invention;

FIG. 35 is an exploded view in partial cross-section of the supply valve of FIG. 34;

FIG. 36 is a cross-sectional view of the ball valve member of FIG. 35;

FIG. 37 is a front view of the valve of FIG. 34 in the "open" configuration;

FIG. 38 is a schematic view of the valve of FIG. 37 in the "open" configuration;

FIG. 39 is a front view of the valve of FIG. 34 in the "test" configuration;

FIG. 40 is a schematic view of the valve of FIG. 39 in the "test" configuration;

FIG. 41 is a front view of the valve of FIG. 34 in the "drain & off" configuration;

FIG. 42 is a schematic view of the valve of FIG. 41 in the "drain & off" configuration;

FIG. 55 is an exploded view in partial cross-section of the valve of FIG. 43;

FIG. 56 is a cross-sectional view of the ball valve member of FIG. 55;

FIG. 57 is a front view of another arrangement for supplying, testing and draining a fire suppression water sprinkler system according to the present invention;

FIG. 62 is a rear view of the supply valve of FIG. 58;

FIG. 63 is a cross-sectional view of the supply valve of FIG. 57;

FIG. 64 is a view through the line 64—64 of FIG. 62;

FIG. 65 is a cross-sectional view of a second preferred embodiment of the valve member for the supply valve of FIG. 58;

FIG. 66 is an exploded view of the supply valve of FIG. 58;

DETAILED DESCRIPTION OF THE PREFERRED EMBODIMENTS

Figure 9:
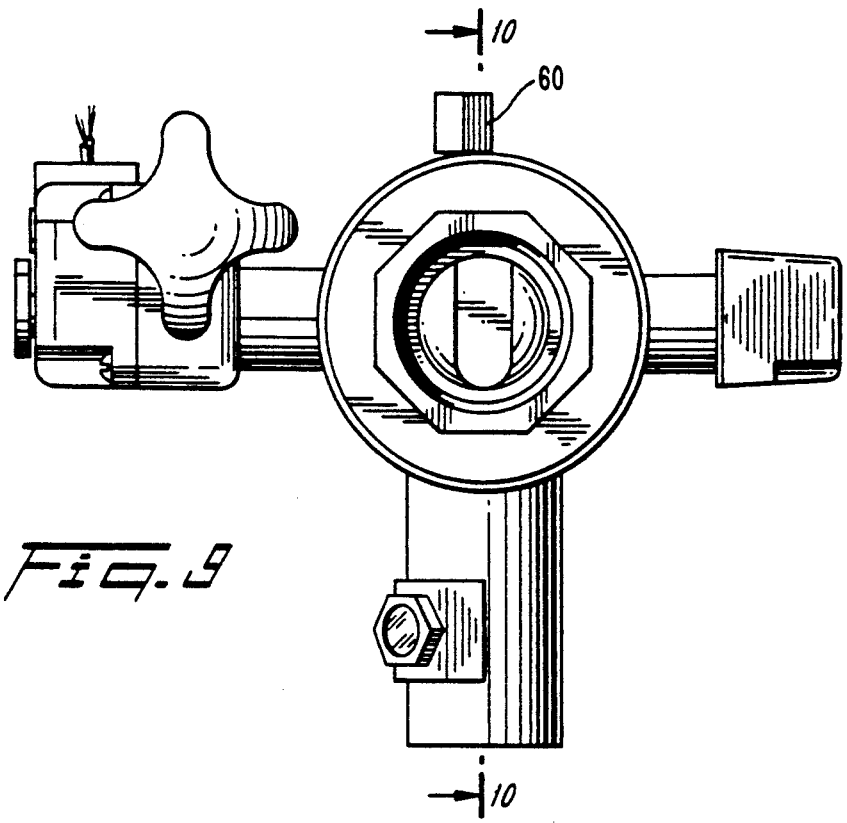
FIG. 9 is an end view of the valve of FIG. 2.

With reference to FIG. 1, an arrangement for supplying, testing and draining a fire suppression water sprinkler system includes a main conduit 30 for supplying water. The conduit 30 supplies a branch conduit 32 by way of a Tee fitting 34. A supply valve 36, according to the present invention, is provided for the branch conduit 32 with the supply valve 36 operable to permit or to interrupt the flow of water through the branch conduit 32.

The supply valve 36 has an inlet 66 which is connected to the branch conduit 32 and a first outlet 64 which is connected to a plurality of individual water sprinklers (not shown) through a piping arrangement including a conduit 33. The supply valve 36 also has a second outlet 68 which may be connected to a drain. The supply valve 36 is preferably provided at a location which is physically lower than the piping arrangement and the plurality of individual water sprinklers downstream of the supply valve 36 which are supplied with water by the branch conduit 32. In this way, the entire water sprinkler system downstream of the supply valve 36 may be drained as desired through the second outlet 68 of the supply valve 36.

As is conventional in the art, the individual fire sprinklers (not shown) are provided with a member that melts when the ambient temperature reaches a predetermined level indicative of a fire. Upon melting, the member opens the fire sprinkler to spray water to suppress the fire.

When it is desired to replace one or more of the individual water sprinklers, the valve 36 is closed and the water sprinkler system is preferably drained through the second outlet 68 of the supply valve 36, so that the removal of one or more of the individual water sprinklers will not result in a flow of water through the fitting for the water sprinkler.

The inlet 66 of the supply valve 36 is threaded onto a section of pipe in the branch conduit 32. Likewise, the first outlet 64 is threaded onto a section of pipe in the arrangement of individual water sprinklers downstream of the supply valve 36. Other arrangements, such as bolted flanges or grooved end couplings for connecting the inlet of the supply valve 36 to the branch conduit 32 and for connecting the first outlet 64 to the arrangement of individual water sprinklers will be readily obvious to one skilled in the art.

The second outlet 68 of the supply valve 36 is provided with a pair of integral sight glasses 52 which are threadably received at two openings that are separated from each other by an angle of about 90 degrees. Alternatively, the sight glasses may be omitted or may be provided in a separate housing which is provided downstream of the second outlet 68 of the supply valve 36.

As shown in FIG. 1, it is preferred that the sight glasses 52 be offset 45 degrees to either side of a plane passing through a longitudinal axis of the valve 36 and the second outlet 68. However, it is understood that the primary considerations in determining the orientation of the sight glasses are the relationship between the housing and any obstructions, such as walls, that may interfere with a user's access to the sight glasses, and the ease of visibility of a flow through the sight glasses in any given orientation.

By employing the preferred sight glass arrangement, the visual observation of flow through the valve 36 is enhanced. For example, a light may be directed into one of the sight glasses furthest from the person checking the flow condition so as to illuminate the inside of the sight glass housing thus permitting the person to easily see the flow condition therein, typically by the passage of air bubbles through the sight glass housing.

The second outlet 68 of the supply valve 36 may be connected directly to a drain (not shown). Alternatively, the second outlet 68 of the supply valve 36 may be left unconnected. In this way, the flow of water through the second outlet 68 of the supply valve 36 would be visually observed without the use of a sight glass. If, however, no visual inspection of the flow of water is necessary, the second outlet of the supply valve 36 may be connected directly to drain.

The supply valve 36 may be provided with a pressure gauge (not shown) by way of a pressure port 58. The pressure gauge is provided adjacent the first outlet for the supply valve and senses the pressure in the supply valve 36 at the first outlet of the valve. If the pressure gauge 56 is omitted, a plug 60 is threadably received by the pressure port 58 or a pressure relief valve may be provided.

With reference now to FIG. 2, the housing 62 of the supply valve 36 according to the present invention has three threaded openings 64, 66 and 68 which are coplanar. The openings 64 and 66 are colinear and the opening 68 is arranged perpendicularly with respect to the other two openings 64, 66. When in use as in the arrangement of FIG. 1, the middle opening 68 is the outlet to drain and the opening 64 is the outlet to the arrangement of sprinklers. The opening 66 is connected to the supply conduit as described above.

A valve actuator mechanism 82 is provided to permit manual operation of the valve. A flow switch mechanism 38 is provided generally opposite to the valve actuator mechanism as described more fully below.

With reference to FIG. 5, the valve actuator mechanism 82 includes an indicator 108 which has three positions denoted by the legends "open", "test", and "drain & off".

With reference to FIG. 11, the valve actuator arrangement 82 includes a shaft 110 with a worm gear to drive a turn wheel 112. The turn wheel 112 is provided on a valve actuator member 114 which when rotated moves a valve member 84 within the housing 62 of the supply valve 36.

The valve actuator arrangement is conventional and is typically found in connection with butterfly valves. Local regulations typically require that the valve member in a supply valve for a fire protection water sprinkler system be unable to move between a closed position and a fully open position in less than a preselected period of time. A suitable, conventional gear operator and valve actuator provides the required time delay in valve member movement so as to prevent the supply valve from being suddenly opened or closed. Such a sudden opening or closing of the supply valve can result in a harmful shock to the water supply system.

The indicator 108 is arranged to move with the valve actuator 114. The indicator 108 points to the appropriate legend to show the orientation of the valve member within the housing. If desired, the gear operator may also be provided with an electric tamper switch 116 which can indicate the orientation of the valve member to a remote location (as by the electrical wires 118) and may also sound an alarm to indicate that the supply valve has been closed or is in other than a full open position.

Suitable, conventional apparatus for moving the valve member and for electrically indicating the orientation of the valve member is provided by the Milwaukee Valve Company, Inc. of Milwaukee, Wis. in connection with a Butterball "slow-close" butterfly valve. Other suitable, conventional arrangements for the valve actuator and for the tamper switch may be utilized as will be readily apparent to one skilled in the art. For example, the tamper switch function may be provided by a microswitch provided in the gearbox of the actuator.

In order to comply with local ordinance, it may be necessary to provide a flag or other indication of the configuration of the valve. Such indicators are conventional and may be provided as desired.

Integral with the supply valve 36 is provided a water flow switch 38. With reference to FIG. 11, the water flow switch 38 includes a paddle 120 or other member (not shown) which extends into the interior chamber of the housing 62 of the supply valve 36. The paddle 120 includes a shaft 122 which is received within a threaded opening 124 in the housing 62. The threaded opening 124 in the housing 62 preferably is provided coaxially with a turning axis of the valve member 84 of the supply valve. In this way, the paddle 120 may be deflected by a flow of water from the inlet 66 through either the first outlet 64 or through the second outlet 68.

Deflection of the paddle 120 closes a switch in a suitable, conventional manner to provide a signal by way of a pair of electrical wires (see FIG. 15). Deflection of the paddle to indicate flow through the inlet may be used to trigger a fire alarm or to alert a fire department.

In the preferred embodiment, the paddle of the flow sensor is provided centrally within the valve member 82. In this way, a single flow sensor may be used to indicate a flow of water through the first outlet (i.e., in the event of a fire) and may also indicate a flow of water through the second outlet as in a test operation. In this way, the need for the sight glasses may be obviated unless required by local ordinance.

The paddle is inserted into the central portion of the ball valve member 82 by curling the paddle into a tube and inserting the tube through the threaded opening 124. The paddle then uncurls when properly positioned in the central portion of the ball valve member. The paddle 120 may be configured so as to substantially cover the entire passageway through the ball valve member, as shown in FIG. 13. Preferably, however, and as may be necessary to comply with local ordinances, the paddle may be configured with as little cross-sectional area as possible so as to minimize the potential obstruction of the passageway yet still provide a reliable indication of flow through the passageway (when only a single water sprinkler has opened). For example, the physical size of the paddle may be substantially smaller than the cross-sectional diameter of the inlet. In addition, the paddle may be oriented at an angle (other than perpendicular) relative to the direction of flow from the inlet. In such an arrangement, the effective cross-sectional area of the paddle will be reduced. A suitable, conventional flow switch is provided by Grinnell Corporation as model VSR-D.

Figure 10:
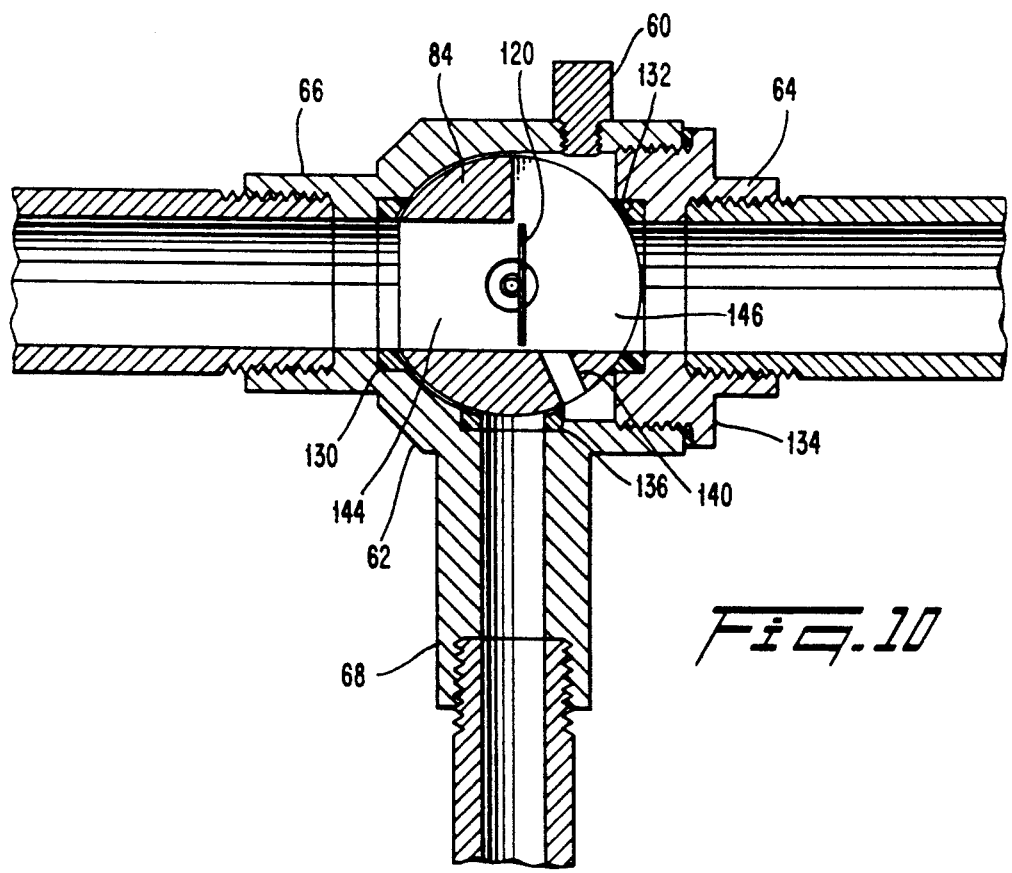
FIG. 10 is a view through the line 10—10 of FIG. 9.

With reference now to FIG. 10, the valve member or ball member 84 is received within the interior chamber of the housing 62 of the supply valve 36. The housing 62 is configured so as to receive the ball member 84 through the opening 64 which is connected to the arrangement of water sprinklers. A first annular seal is provided adjacent to the ball member 84 at the inlet 66 of the valve. The first annular seal 130 preferably has an annular lip about an inner surface of the seal to sealingly conform to the spherical shape of the ball member 84.

A seat 132 is provided adjacent to the ball member 84 at the first outlet 64. The seat 132 is relatively rigid in comparison with a seal and a resilient member such as a spring may be provided between the seat and a threaded ball member retainer 134 to snugly urge the ball member against the first seal when the assembly has been completed. In this way, leakage is prevented or minimized through the valve 36 when in the "drain & off" configuration. Because of the configuration of the valve arrangement, even if the valve should leak slightly when in the "drain & off" configuration, the water from the inlet would be directed to the drain through the outlet 68 and would not pass through the arrangement of sprinkler heads downstream of the supply valve.

The retainer 134 and one or more of the threaded openings 64, 66, 68 are provided with a hexagonal peripheral surface so as to facilitate assembly and disassembly of the supply valve 36.

An annular seal 136 is also provided adjacent to the ball member at the second outlet 68. The seal 136 preferably has an annular lip provided about an inner surface of the seal to sealingly conform to the spherical shape of the ball member 84. The seal 136 is arranged so as to seal the ball member with respect to the second outlet when the valve is in the "open" configuration.

Other suitable, conventional housing arrangements may be utilized as desired. For example, a three piece casting which is bolted together during assembly may be economically worthwhile for certain size valves according to the present invention. Such a three piece valve housing may also facilitate servicing and repair of the valve, as needed.

The ball member 84 is provided with a slot 98 (see FIG. 3) which is adapted to receive a lowermost tab 100 of the valve actuator or stem 114. The stem is inserted into the valve housing 62 through an opening 103 which is perpendicular to the openings 64, 66, 68. The stem 114 is rotated by the gear operator 82. Suitable packing may be provided for the stem 114 as desired.

With reference to FIG. 10, the ball member 84 is provided with a first port 140 having a cross-sectional area corresponding to the opening provided by one of the individual sprinklers in the fire suppression water sprinkler system. The first port 140 communicates with the second and third ports 144, 146 provided in the ball member 84. The second and third ports 144, 146 have a cross-sectional area which is relatively large in comparison with the first port 140 so that the second and third ports can quickly supply water to the arrangement of sprinklers in the event of a fire. In the embodiment of FIG. 10, the first, second and third ports are coplanar so that rotation of the ball member about an axis perpendicular to all three ports can selectively ring the ports into (and out of) communication with the inlet and two outlets of the supply valve.

If desired, the slot 98 provided in the ball member 84 extends into the ball member in a direction perpendicular to the directions in which the central axes of each of the openings 140, 144, 146 extend. The ball member 84 may then be provided with a slot which is tapered along the surface of the ball member to present a shape which is non-symmetrical about a center line extending through the ball member in a direction parallel to the central axes of the first and third ports. This slot (not shown) is matable with a lowermost tab of the stem 114 so that the ball member and stem may only engage each other when the slot and tab 100 are aligned. This construction ensures that the ball member ports are properly oriented with respect to the openings in the supply valve.

While the preferred embodiments as described in the present application include a spherical shaped valve which is of solid construction except for the various passageways, the valve member may have a relatively thin wall construction (see FIG. 4) which may be cast or machined as appropriate. In such a thin walled construction, the valve ports would have the same configuration as the peripheral configuration of the ports provided in an otherwise solid ball valve member. In addition, the present invention may be adaptable to other suitable, conventional valve configurations.

With reference now to FIG. 10, the ball valve member 84 according to the present invention includes first, second and third ports 140, 144, and 146. The ports may be provided in the solid ball member in any suitable, conventional manner such as by drilling. The generally solid ball member 84 is completely interchangeable with the thin-walled ball member 84' of FIG. 4 and only differs in its internal construction. The solid ball member weighs more and may therefore be more costly to manufacture. However, the solid ball may be manufactured more readily, at least in relatively small quantities.

Other valve arrangements are also within the scope of the claims. For example, a plug valve (not shown) wherein the valve member comprises a truncated cone may be modified in accordance with the present invention by providing first, second and third ports in the valve member in the manner disclosed above.

In the ball valve member 84 of FIG. 10, the second port 144 has a cross-sectional diameter which corresponds to the cross-sectional diameter of the conduit 32 and the inlet opening 66. The third port 146 has a cross-sectional opening which is at least as large as the second port 144 in order to permit a fully opened flow of water through the valve when in the "open" configuration. In the preferred embodiment, however, the third opening 146 is substantially larger than the second opening 144.

As shown in FIG. 10, the third opening 146 preferably extends to the "12 o'clock" position in the valve member when the valve is in the "open" configuration. The first port 140 is provided at approximately the "5 o'clock" position and is arranged so as to be located between the seat 132 and the second seal 136 when the valve is in the "open" configuration. In this way the outlet 68 remains sealed when the valve is in the "open" configuration. In order to permit the outlet 68 to be sealed in such a configuration, the second outlet 68 has been made substantially smaller than the inlet 66 and the first outlet 64. Since the second outlet 68 only provides the test and drain functions, the reduced size of the second outlet in comparison with the inlet and the first outlet does not present any difficulty. Moreover, industry standards indicate that the drain piping need only have a cross-sectional dimension which is about one-half the cross-sectional dimension of the supply piping.

With reference now to FIG. 20, the supply valve 36 has the indicator 108 in the "open" position. The ball member is positioned by the gear operator so that a solid portion of the spherical outer surface of the ball member is oriented toward the second outlet 68 of the supply valve. With reference to FIG. 21, the second port 144 is positioned adjacent the inlet 66 of the supply valve with the third port 146 positioned adjacent the first outlet 64. Accordingly, water is permitted to flow through the inlet 66 to the first outlet 64 at the first preselected flow rate (the fully open flow rate). Water is not permitted to flow through the ball member from the inlet of the valve to the second outlet 68.

A flow of water through the first outlet will deflect the paddle of the flow sensor which will in turn cause the flow sensor to provide a signal to indicate the flow through the first outlet. After the system has been fully supplied with water and is in a static configuration, the flow of water from the inlet to the first outlet will indicate that at least one of the sprinklers has opened, typically as a result of a fire.

With reference now to FIG. 22, the gear operator has been moved and the indicator now points to the "test" position. With reference to FIG. 23, the ball member 82 has been rotated clockwise sufficiently to permit the first port 140 of the ball member to provide communication between the inlet 66 and the second outlet 68. Water is therefore free to flow through the second port 144 through the relatively small opening of the first port and then through the outlet of the valve. At this time communication (albeit somewhat restricted) is still provided between the inlet and the first opening 64. This communication permits the pressure in the system to be sensed by the pressure gauge, if provided, at the first outlet during a test operation. A flow of water through the second outlet during the test operation will deflect the paddle of the flow sensor which will in turn cause the flow sensor to provide a signal to indicate the flow through the second outlet.

With reference now to FIG. 24, the gear operator has again been moved to rotate the ball member further in a clockwise direction. The indicator now points to the "drain" legend. With reference to FIG. 25, a clockwise rotation of the ball member 84 has presented a portion of the third port 146 adjacent the first outlet of the valve and has also presented a portion of the third port 146 adjacent the second outlet of the supply valve. A solid portion of the ball member is provided adjacent the inlet 66 of the supply valve to interrupt the supply of water. Water is then free to flow through the second and third ports from the first outlet to the second outlet of the valve.

With reference now to FIG. 26 another arrangement for supplying, testing, and draining a suppression water sprinkler system includes a supply valve 36' having a modified ball valve member 84'. The supply valve and arrangement of FIG. 26 is otherwise identical to that of FIG. 1.

With reference to FIG. 27, the ball valve member 84' is provided with first, second, and third ports 140', 144', and 146' about a periphery of the ball valve member.

The second port 144' has a cross-sectional diameter which corresponds to the cross-sectional diameter of the conduit 32 and the inlet opening 66. The second port extends over an angle of about 60 degrees, i.e., from 240 degrees to 300 degrees when the valve is oriented in the "open" configuration. The third port 146' has a cross sectional opening which is at least as large as the second port 144' in order to permit a fully opened flow of water through the valve when in the "open" configuration. In the embodiment of FIG. 27, however, the third opening 146' is somewhat smaller than the third opening 146 of the embodiment of FIG. 10.

As shown in FIG. 27, the third opening 146' preferably extends from about 27.5 degrees to about 120 degrees when the valve is in the "open" configuration. The first port 140' is provided at approximately the "5 o'clock" position and is arranged so as to be located between the seat 132 and the second seal 136 when the valve is in the "open" configuration. In this way the outlet 68 remains sealed when the valve is in the "open" configuration.

In order to permit the outlet 68 to be sealed in such a configuration, the second outlet 68 has been made substantially smaller than the inlet 66 and the first outlet 64 and is also offset in the downstream direction. The first port 140' preferably extends from about 125 degrees to about 140 degrees when the valve is in the "open" configuration. The second outlet for the valve preferably has its most upstream edge located at about 187.5 degrees.

With reference now to FIG. 28, the supply valve 36' has the indicator 108 in the "open" position. The ball member is positioned by the gear operator so that a solid portion of the spherical outer surface of the ball member is oriented toward the second outlet 68 of the supply valve. With reference to FIG. 29, the second port 144' is positioned adjacent the inlet 66 of the supply valve with the third port 146' positioned adjacent the first outlet 64. Accordingly, water is permitted to flow through the inlet 66 to the first outlet 64 at the first preselected flow rate (the fully open flow rate). Water is not permitted to flow through the ball member from the inlet of the valve to the second outlet 68.

A flow of water through the first outlet will deflect the paddle of the flow sensor which will in turn cause the flow sensor to provide a signal to indicate the flow through the first outlet. After the system has been fully supplied with water and is in a static configuration, the flow of water from the inlet to the first outlet will indicate that at least one of the sprinklers has opened, typically as a result of a fire.

With reference now to FIG. 30, the gear operator has been moved and the indicator now points to the "test" position. With reference to FIG. 31, the ball member 84' has been rotated clockwise sufficiently to permit the first port 140' of the ball member to provide communication between the inlet 66 and the second outlet 68. Water is therefore free to flow through the second port 144' through the relatively small opening of the first port and then through the outlet of the valve. At this time communication (albeit somewhat restricted) is still provided between the inlet and the first opening 64. This communication permits the pressure in the system to be sensed by the pressure gauge, if provided, at the first outlet during a test operation. A flow of water through the second outlet during the test operation will deflect the paddle of the flow sensor which will in turn cause the flow sensor to provide a signal to indicate the flow through the second outlet.

With reference now to FIG. 32, the gear operator has again been moved to rotate the ball member further in a clockwise direction. The indicator now points to an "off" legend rather than to a "drain" legend. This is because one of the purposes and advantages of the embodiment of FIGS. 26–33 is the ability to shut off both the inlet of the valve and the first outlet of the valve when desired.

With reference to FIG. 33, a clockwise rotation of the ball member 84' has presented a solid portion of the ball member 84' adjacent to the inlet 66 of the valve and has also presented a solid portion of the ball member 84' adjacent to the first outlet 64 of the valve. Therefore, the second outlet 68 has been isolated from both the inlet and from the first outlet. Accordingly, the flow switch 38 may be removed from the valve and repaired or replaced as desired without requiring the system of water sprinklers to be drained.

In order to drain the system of water sprinklers, it may be possible to move the actuator slightly so as to position the valve member to provide limited communication between the first and second outlets (through the third port 146') while still blocking communication between the inlet and the outlets. However, such an arrangement may provide a relatively slow drainage of the system.

If desired, the supply valve according to the present invention could be configured so that the inlet is oriented toward the right rather than toward the left. In addition, it may be desirable to orient the supply valve with the inlet directed upwardly or downwardly. The modifications to the supply valve so as to accommodate these changes in orientation are believed to be readily apparent in view of the specification and drawings herein.

If desired, it may be possible to provide the stem 114 as a "blow-out proof stem" which is inserted into the opening of the valve housing through the first outlet 64. The opening of the valve housing to receive the stem is preferably configured so as to have an interior shoulder which receives a corresponding flange of the stem. In this way, in the event that the threads which retain the gear actuator on the valve housing should fail, the stem would not be propelled outwardly by reason of the water pressure acting on the stem.

With reference now to FIG. 14, a conventional ball valve 150 includes a housing 152 which has an interior chamber 154 which receives a ball valve member 156. As shown in FIG. 14, the left side of the ball valve 150 is an inlet for the valve and threadably receives a pipe 158. The pipe 158 serves to retain the ball valve member 156 in the interior chamber 154 by urging an annular seat 160 against the ball valve member. The ball valve member 156 in turn is urged against an annular seal 162 which abuts a shoulder in the interior chamber of the valve housing. The right side of the valve 150 provides an outlet for the valve and threadably receives a pipe 164.

If desired, a separate ball valve retainer (see, for example, the member 166 in FIG. 27) could be provided to retain the ball valve member in the interior chamber of the valve housing.

The ball valve member has a passageway 168 which passes completely through the ball valve member in order to provide communication between the inlet and the outlet of the valve. The ball valve member is connected to a suitable, conventional valve actuator such as a valve stem (see the valve stem 114 of FIG. 11) and an actuating lever or other mechanism (such as a lever or the shaft 110 of FIG. 11) which enables the ball valve member to be rotated about a central axis of the ball valve member. In this way, the ball valve member may be rotated so as to provide full communication between the inlet and the outlet, to completely block communication between the inlet and the outlet and to provide communication at a restricted or limited extent between the inlet and the outlet.

To this extent, the ball valve 150 of FIG. 14 is conventional and is intended to represent not only suitable, conventional ball valves but also tapered plug valves and cylindrical valves and any other valves having the general configuration of a housing, an interior chamber and a valve member which is arranged for rotational movement about a central axis of the valve member with a passageway (passing through the central axis) being provided in the valve member.

According to the present invention, a flow switch may be provided in the valve 150 with the flow switch including a paddle 120 which is connected to a shaft 122. The paddle 120 and the shaft 122 are inserted through an opening 170 which is provided along the central axis of the valve member 156 and colinear with the stem or valve actuator of the valve member. In this way, the valve member is free to rotate about the paddle 120 and the shaft 122 of the flow switch.

The opening 170 may be slightly larger than the diameter of the shaft so that the paddle 120 may be wrapped about the shaft during insertion of the paddle 120 and the shaft 122 into the valve housing. The paddle will then unroll after passing beyond the wall of the valve housing and preferably substantially fills the passageway through the valve member. If desired, however, the paddle may be oriented at an angle other than perpendicular to the direction of flow or may be of substantially smaller size than the cross-sectional diameter of the passageway through the valve member so as not to unduly restrict the flow through the valve member.

With reference to FIG. 15, the shaft 122 is configured to pivot about an intermediate portion of the shaft in response to a flow through the valve member. The shaft carries a first electrical contact which is provided closely adjacent to but spaced away from a second electrical contact. When the flow has deflected the paddle and the shaft sufficiently, the first and the second contacts close to complete an electrical circuit which supplies a signal such as an alarm. In this way, the flow switch may indicate the presence of flow through the valve member either at the location of the valve or at a remote location.

With reference to FIG. 16, a conventional three way ball valve 180 includes a housing 182 which has an interior chamber 184 which receives a ball valve member 186. As shown in FIG. 16, the valve housing has three openings. Two of the openings 188, 190 are colinear with one another and the third opening 192 is perpendicular with respect to the first and second openings 188, 190. In the arrangement shown in FIG. 16, the third opening 192 is an inlet for the valve and threadably receives a pipe 194. The first and second openings 188, 190 provide first and second outlets for the valve 180 with the second opening 188 receiving a threaded pipe 196 and the third opening receiving a threaded pipe 198. The pipe 198 serves to retain the ball valve member 186 in the interior chamber 184 by urging an annular seal 200 against the ball valve member. The ball valve member 186 in turn is urged against an annular seal 202 which abuts a shoulder in the interior chamber of the valve housing.

In the three way ball valve of FIG. 16, the ball valve member is provided with seals 200, 202 on either side of the ball valve member and adjacent to the first and second outlets of the valve. In this way, the flow from the inlet may be selectively directed to either the first outlet or to the second outlet and communication between the inlet and the other outlet will be interrupted. Other suitable, conventional flow configurations for a three way ball valve may be utilized as desired depending upon the particular purpose for which the valve is being utilized.

If desired, a separate ball valve retainer (see, for example, the member 166 in FIG. 27) could be provided to retain the ball valve member in the interior chamber of the valve housing instead of the pipe 198.

The ball valve member has a passageway 204 which is preferably L-shaped and which passes completely through the ball valve member in order to provide communication between the inlet and the outlet of the valve. The ball valve member is connected to a suitable, conventional valve actuator such as a valve stem (see the valve stem 114 of FIG. 11) and an actuating lever or other mechanism (such as a lever or the shaft 110 of FIG. 11) which enables the ball valve member to be rotated about a central axis of the ball valve member. In this way, the ball valve member may be rotated so as to provide full communication between the inlet and the first outlet or to provide full communication between the inlet and the second outlet.

To this extent, the three way ball valve 180 of FIG. 16 is conventional and is intended to represent not only suitable, conventional three way ball valves but also three way tapered plug valves and three way cylindrical valves and any other valves having the general configuration of a housing, an interior chamber and a valve member which is arranged for rotational movement about a central axis of the valve member with a passageway (passing through the central axis) being provided in the valve member.

According to the present invention, a flow switch may be provided in the valve 150 in the same manner as described above in connection with the embodiment of FIG. 14 with the flow switch including a paddle 120 which is connected to a shaft 122. The paddle 120 and the shaft 122 are inserted through an opening 170 which is provided along the central axis of the valve member 156 and colinear with the stem or valve actuator of the valve member. In this way, the valve member is free to rotate about the paddle 120 and the shaft 122 of the flow switch.

With reference to FIG. 18, the shaft 122 is configured to pivot both to the left and to the right about an intermediate portion of the shaft in response to a flow through the valve member. The shaft carries a first electrical contact which is provided closely adjacent to but spaced away from second and third electrical contacts. When the flow through the first outlet 188 has deflected the paddle and the shaft sufficiently to the right, the first and the second contacts close to complete an electrical circuit which supplies a signal such as an alarm. When the flow through the second outlet 190 has deflected the paddle and the shaft sufficiently to the left, the first and the third contacts close to complete an electrical circuit which supplies a signal such as an alarm. Preferably, the second and third contacts are arranged so that a first predetermined signal is provided when the first contact closes with the second contact and a second (different) predetermined signal is provided when the first contact closes with the third contact.

In this way, the flow switch may indicate the presence of flow through the first outlet and independently indicate the presence of flow through the second outlet of the valve member either at the location of the valve or at a remote location.

With reference now to FIG. 34, another arrangement for testing and draining a fire suppression water sprinkler system is disclosed wherein a supply valve 242 is provided in communication with a branch conduit 32 of a main conduit 30. The valve 242 has an inlet 264 which is threaded onto a nipple 46 which is in turn threaded into the Tee fitting 40. Other arrangements for connecting the inlet of the valve to the branch conduit 32 will be readily obvious to one skilled in the art. An outlet 268 of the valve 242 is connected to the fitting 269 having a pair of sight glasses 271 threadably received at two couplings of the fitting which are separated from each other by an angle of about 90 degrees.

Another outlet 266 of the valve 242 is connected to an arrangement of fire suppression water sprinklers 243.

With reference now to FIG. 35, the valve 242 according to the present invention includes a housing 262 having the three openings 264, 266 and 268 which are coplanar. The openings 264 and 268 are colinear and the opening 266 is arranged perpendicularly with respect to the other openings 264, 268.

A stop plate 272 is mounted on the valve housing as by a pair of screws 274 which are threadably received by a mounting bracket 276 provided in the valve housing. The stop plate includes first and second shoulders 278, 280 which limit the movement of a control lever 282. The control lever is permitted by the stop plate to travel between "open", "test" and "drain & off" positions.

With reference now to FIG. 36, the valve 242 includes a ball member 284 which is received within an interior chamber of the housing. The valve housing is configured so as to receive the ball member 284 through the first opening 264. The ball member 284 is carried by a first annular seal 286 and by a second annular seal 286' both of which have an inner surface 288 that conforms to the spherical shape of the ball member 284. The seal 286' is provided adjacent to the inlet of the valve (i.e., the opening 264) since the valve of FIG. 35 is arranged to close the inlet 264 with respect to both of the outlets 266, 268.

The seals 286, 286' also have a peripheral surface 290 which is snugly urged into the interior chamber of the housing 262 by the ball member 284 when the assembly has been completed and which is forced against the interior chamber of the housing 262 by the pressure exerted on the seals 286, 286' by the ball member 284. In addition, each of the seals 286, 286' has an outer surface 292. The seal 286 which is positioned in the interior chamber of the housing ahead of the ball member abuts a shoulder (not shown) of the interior housing. The seal 286' which is positioned in the interior chamber behind the ball member 284 during assembly is retained in position by a threaded retainer 270.

The ball member 284 is provided with a slot 298 which is adapted to receive a lowermost tab 300 of a stem 302. The stem is inserted into the valve housing 262 through a threaded opening 303 which is perpendicular to the openings 264 and 268 and colinear with the axis of the opening 266. The stem is provided with an annular bearing 304 and is sealed by a packing 306. A threaded retainer 308 maintains the stem in secure engagement with the slot of the ball member 284.

In a more preferred embodiment, the stem 302 is a "blow-out proof stem" which is inserted into the opening 303 through the first opening 264. The opening 303 is preferably configured so as to have an interior shoulder which receives a corresponding flange of the stem 302. In this way, in the event that the threaded retainer 308 should fail, the stem would not be propelled outwardly by reason of the water pressure acting on the stem. If desired or if required by ordinance, the stem may be actuated by an arrangement such as disclosed in connection with the supply valve of FIG. 1.

The stop plate 272 is then mounted on the housing by way of the screws 274. The control lever 282 is then mounted on the stem 302 by a nut 310. The control lever 282 has a depending tab 312 which selectively abuts the stops 278, 280 of the stop plate 272 to limit movement of the control lever. In this way, movement of the ball member 284 is likewise limited to movement between the "open", "test" and "drain & off" positions.

In FIG. 36, the ball member 284 is provided with a first port 324 having a cross-sectional area corresponding to the opening provided by one of the individual sprinklers in the fire suppression water sprinkler system. The first port 324 communicates with second, third and fourth ports 326, 327, 328 provided in the ball member 284. The second, third, and fourth ports 326, 327, 328 have a cross-sectional area which is relatively large in comparison with the first port 324 so that the second, third, and fourth ports can fully supply and quickly drain the water sprinkler system. The first, third, and fourth ports are coplanar with the second port 326 being perpendicular to the other three ports. Alternatively, the fourth port 328 may be considered to be perpendicular to the other three coplanar ports.

In the present embodiment, the second port 326 is always in communication with the first outlet 266 of the valve.

If desired, the ball member 284 may be provided with a slot (not shown) which is tapered along the surface of the ball member to present a shape which is non-symmetrical about the turning axis of the ball member 284. This slot 298 is matable with the lowermost tab 300 of the stem 302 so that the ball member and stem may only engage each other when the slot 298 and tab 300 are aligned. This construction ensures that the ball member ports are properly oriented with respect to the openings in the valve 242 as discussed above.

With reference now to FIG. 37, the valve 242 of FIG. 34 (with the sight glass housing not shown) has the control lever 282 in the "open" position. With reference to FIG. 38, the second port 326 is positioned adjacent the second opening 266 and the third port 328 is positioned adjacent the first opening 264 (the inlet for the valve). The other outlet 268 of the valve is closed by the solid portion of the ball valve member 284 which is positioned adjacent the seal 288. Accordingly, water is not permitted to flow through the ball member from the inlet of the valve to the second outlet 268 but a fully open communication is provided between the inlet of the valve and the first outlet 266.

With reference now to FIG. 39, the control lever has been rotated counterclockwise through 90 degrees to the "test" position. With reference to FIG. 40, a counterclockwise rotation of the ball member 284 through 90 degrees has presented the first port 324 adjacent the second outlet 268 of the valve. Water is therefore free to flow through the relatively large port 326 of the ball valve through the relatively small opening of the first port 324 and then through the second outlet 268 of the valve to test the valve. Simultaneously, communication is also provided between the inlet and the first outlet 266 by the ports 327 and 326.

With reference now to FIG. 41, the control lever has been rotated counterclockwise through an additional 90 degrees to the "drain & off" position with reference to FIG. 42, a counterclockwise rotation of the ball member 284 through an additional 90 degrees has presented the third port 328 adjacent the outlet of the valve. Water is then free to flow through the second and fourth ports from the first outlet 266 to the second outlet 268 to drain the valve. Simultaneously, a solid portion of the ball valve member is provided adjacent the seal 286' to close the inlet of the valve with respect to the first and the second outlets.

The valve 242 of FIG. 34 may be oriented as desired so that the first outlet of the valve is directed in whatever direction is most convenient. Typically, the valve is oriented with the inlet provided at the bottom of the valve with the first outlet extending upwardly. Therefore, although the valve 242 is shown in FIG. 37 to be oriented as a "left-handed" valve, it is to be understood that the valve 242 may be made oriented in whatever manner is desired. If necessary, the stop plate and the orientation of the handle 282 may be readily reconfigured as appropriate for the orientation of the valve.

Figure 43:
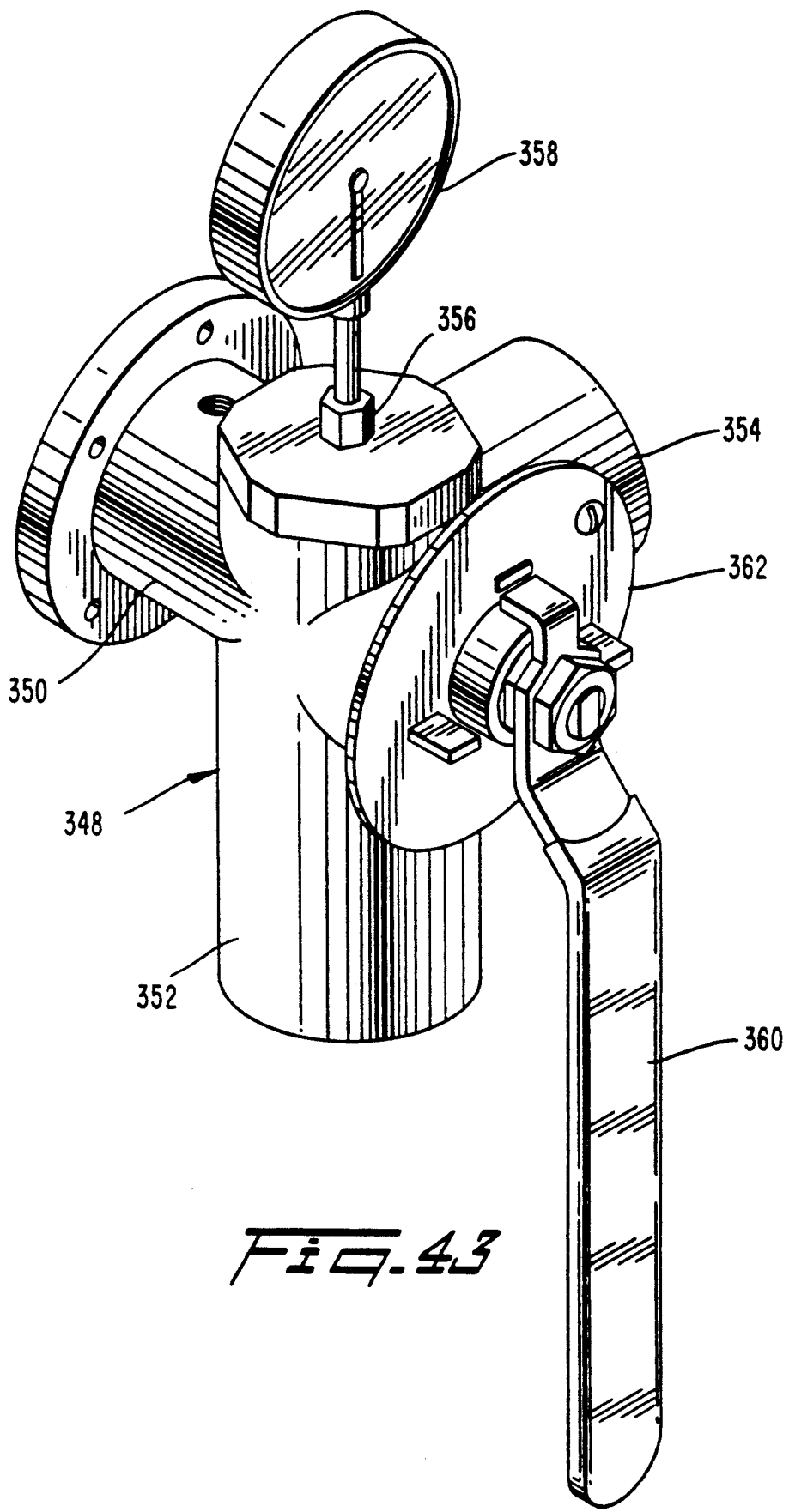
FIG. 43 is a pictorial view of another valve according to the present invention.

With reference now to FIG. 43 another supply valve 348 according to the present invention is provided with an inlet 350 and a first outlet 352. A second outlet 354 is provided with the inlet and the first and second outlets being oriented at 90 degrees with respect to one another.

The valve 348 may be provided with a pressure port 356 and a pressure gauge 358 as desired. If a pressure gauge is not required, the pressure port may be closed by a suitable plug, not shown. A valve actuator 360 is provided opposite to the inlet 350 of the valve. A stop plate is provided in connection with the actuator in order to limit movement of the actuator as appropriate.

Figure 44:
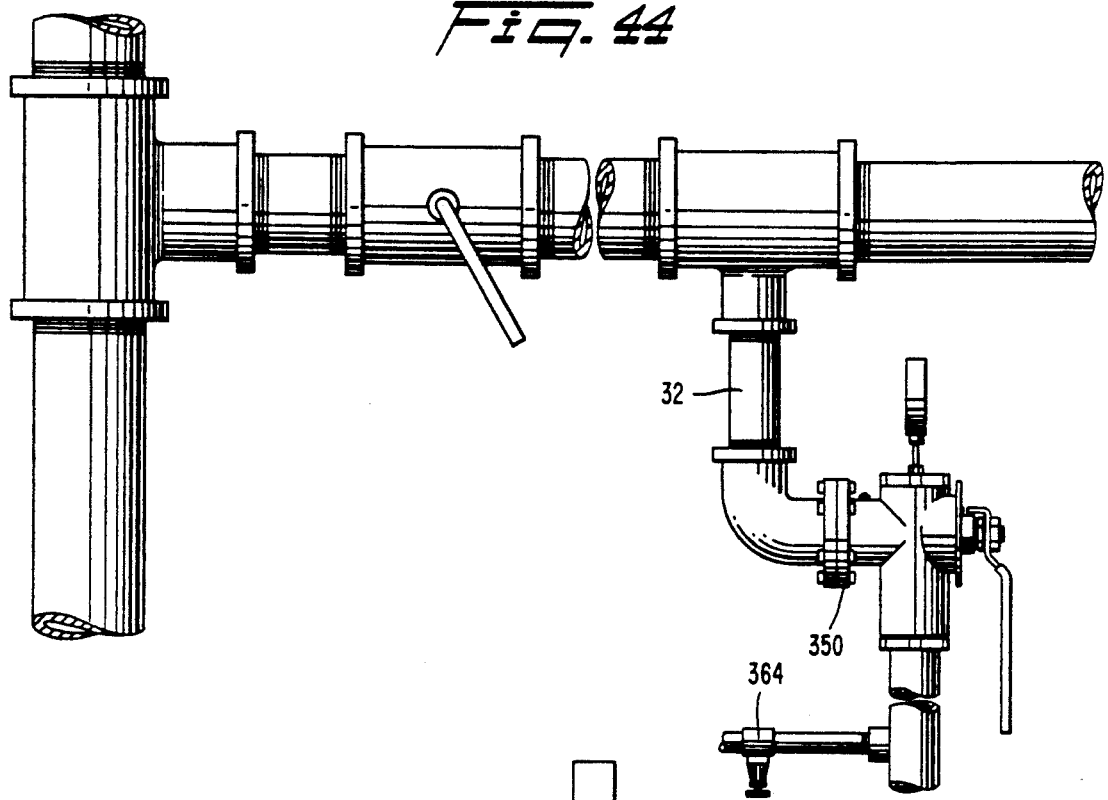
FIG. 44 is a view of another arrangement for supplying, testing, and draining a fire suppression water sprinkler system according to the present invention.
Figure 45:
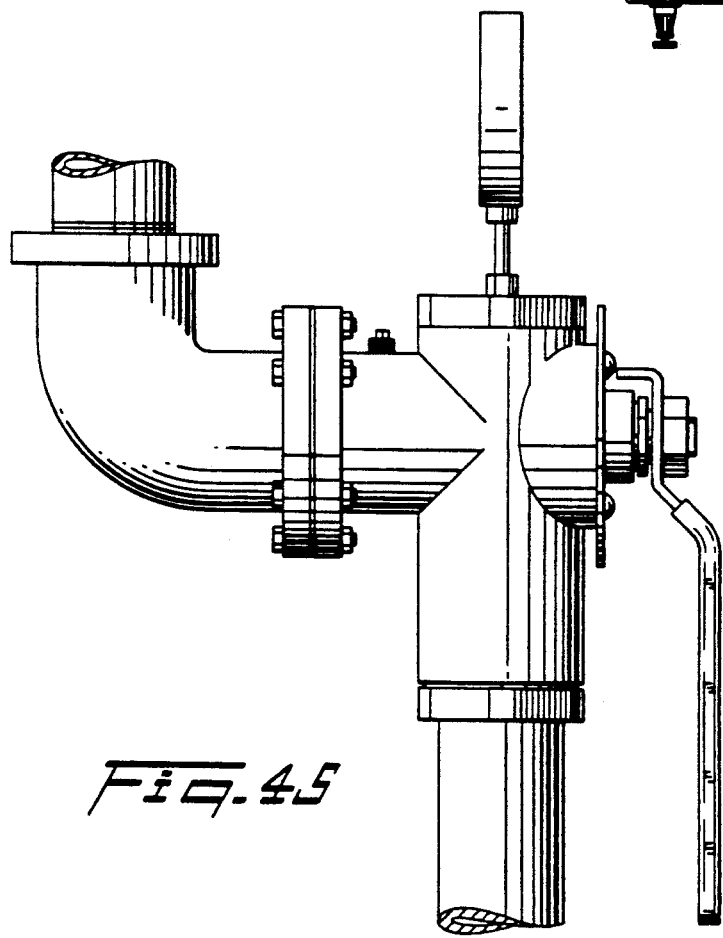
FIG. 45 is a side view of the valve of FIG. 44.

With reference now to FIG. 44, the inlet 350 of the valve 348 is connected to a source of water through a conduit 32. The first outlet of the valve is connected to an arrangement of fire suppression water sprinklers 364.

Figure 46:
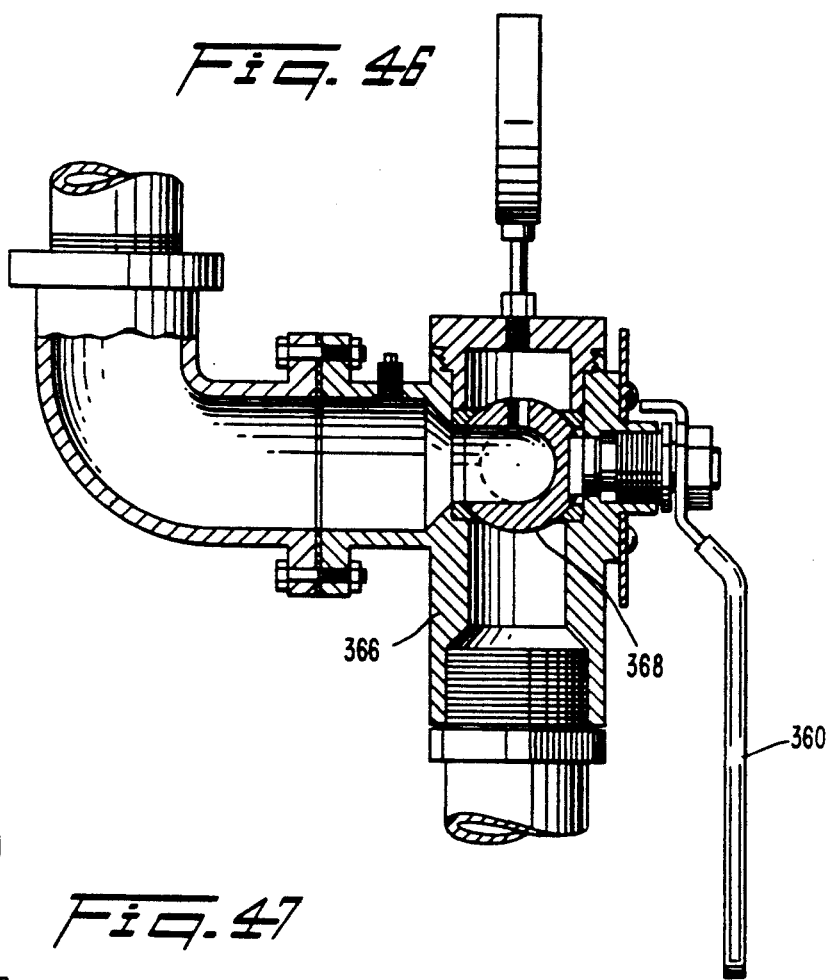
FIG. 46 is a side view in partial cross-section of the valve of FIG. 44.

The valve 348 includes a valve housing 366 having an interior chamber which receives a ball valve member 368 (see FIG. 46). The actuator 360 for the ball valve member is identical to the actuator 282 described in connection with the supply valve of FIG. 35.

Figure 47:
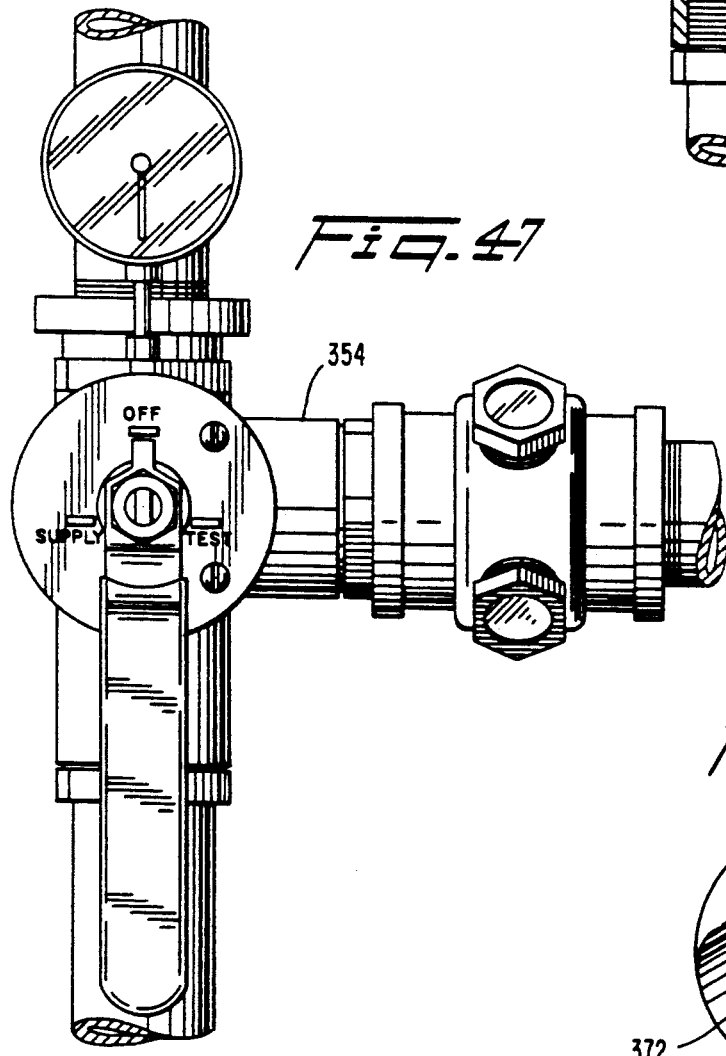
FIG. 47 is a front view of the valve of FIG. 44.

With reference to FIG. 47, the second outlet 354 of the valve member may be provided with a sight glass arrangement such as has been described in connection with the valve of FIG. 35. The second outlet 354 may be connected directly to a drain (not shown) or may be left unconnected. If not directly connected to a drain, the need for a sight glass arrangement is significantly reduced or may be completely eliminated.

Figure 48:
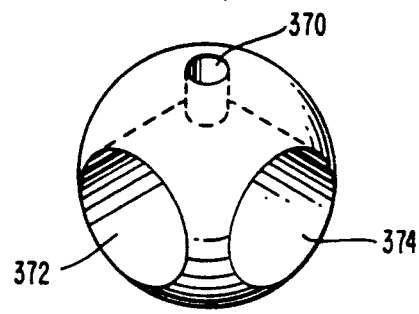
FIG. 48 is a pictorial view of the valve member of the valve of FIG. 46.

The ball valve member 368 (see FIG. 48 and FIG. 56) includes a first port 370 having a cross-sectional diameter corresponding to the opening provided by a single fire suppression water sprinkler when open. The ball valve member 368 also includes second and third ports 372, 374 which each have a cross-sectional diameter relatively large in comparison with the cross sectional diameter of the first port 370.

With reference now to FIG. 55, the ball valve member 368 is received within an interior chamber of the housing of the valve. The valve housing is configured so as to receive the ball member 368 through an opening 376 provided opposite and colinear with the first outlet 352. The ball member 368 is carried by an annular seal 386 and by an annular seat 386l both of which have an inner surface 388 that conforms to the spherical shape of the ball member 368. The seal 386 is provided adjacent to the first outlet of the valve (i.e., the opening 352) since the valve of FIG. 43 is arranged to close the inlet 350 with respect to the first outlet 352.

The seat 386' may preferably be comprised of two portions which are separated from one another by a gap of a few degrees. In this way communication between the inlet 350 and the opening 376 is maintained regardless of the orientation of the ball valve member and the pressure may be reliably sensed at the port 356. Alternatively, the pressure may be sensed upstream of the ball valve member.

The valve 348 is also configured to seal the inlet with respect to the second outlet 354. Accordingly, the passageway through the second outlet is of a reduced diameter and an annular seal 390 is provided adjacent the second outlet 354 (see also FIG. 52). The passageway through the second outlet and the seal 390 are of a reduced diameter so as not to interfere with the seal and seat 386, 386'.

Figure 49:
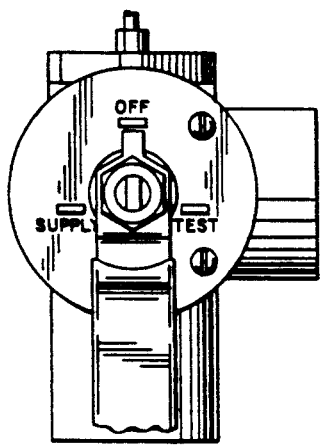
FIG. 49 is a front view of the valve of FIG. 43 in the "off" configuration.
Figure 50:
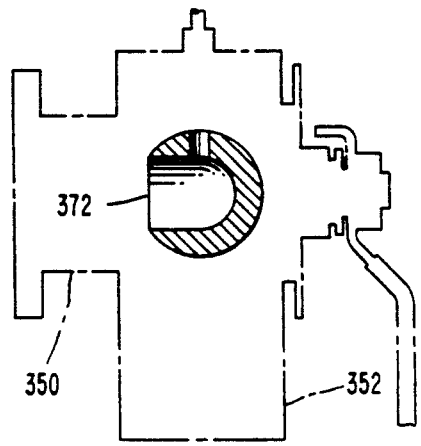
FIG. 50 is a side schematic view of the valve of FIG. 49 in the "off" configuration.

With reference now to FIG. 49, the valve of the present embodiment is initially in the "off" configuration. With reference to FIG. 50, the second port 372 is in communication with the inlet 350 of the valve and the first outlet is sealed by a solid portion of the ball valve member positioned adjacent to the first outlet 352. Likewise, the second outlet 354 is sealed by a solid portion of the ball valve member positioned adjacent to the second outlet of the valve. Accordingly, water is not permitted to flow through the ball member from the inlet of the valve to either the first outlet or the second outlet.

Figure 51:
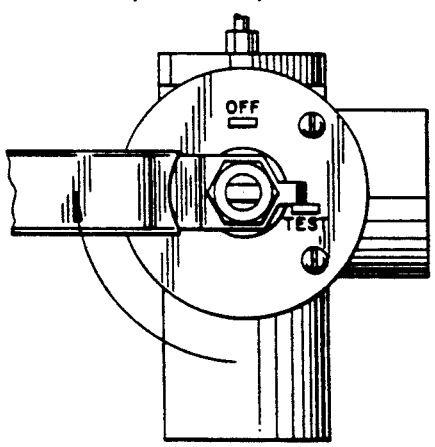
FIG. 51 is a front view of the valve of FIG. 43 in the "test" configuration.
Figure 52:
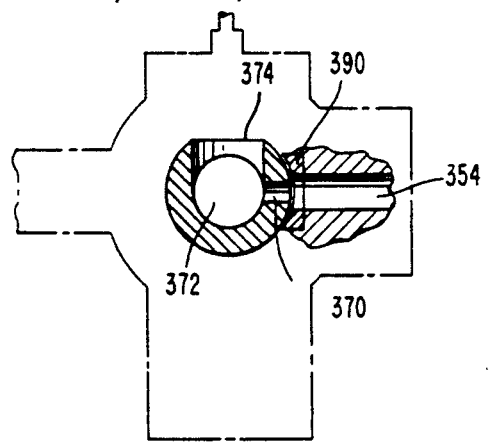
FIG. 52 is a schematic view of the valve of FIG. 51 in the "test" configuration.

With reference now to FIG. 51, the control lever has been rotated counterclockwise through 90 degrees to the "test" position. With reference to FIG. 52, a counterclockwise rotation of the ball member 368 through 90 degrees has presented the first port 370 adjacent the second outlet 354 of the valve. Water is therefore free to flow through the relatively large port 372 of the ball valve through the relatively small opening of the first port 324 and then through the second outlet 354 of the valve to test the valve. Simultaneously, communication remains blocked between the inlet and the first outlet 266 by the solid portion of the ball valve member which is positioned adjacent to the first outlet. When the testing of the valve has been completed, the handle is rotated in the reverse direction to return the valve to the "off" configuration of FIG. 49.

Figure 53:
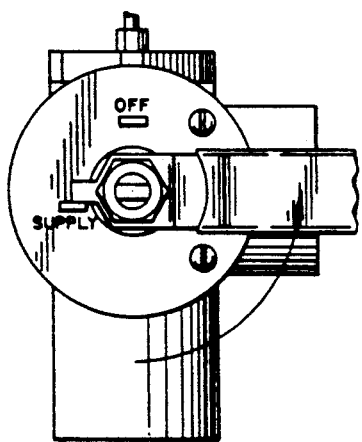
FIG. 53 is a front view of the valve of FIG. 34 in the "supply" configuration.
Figure 54:
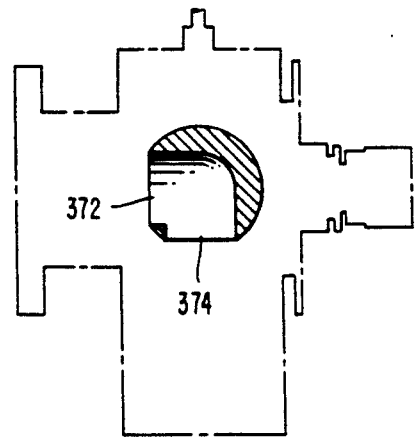
FIG. 54 is a side schematic view of the valve of FIG. 53 in the "supply" configuration.
Figure 58:
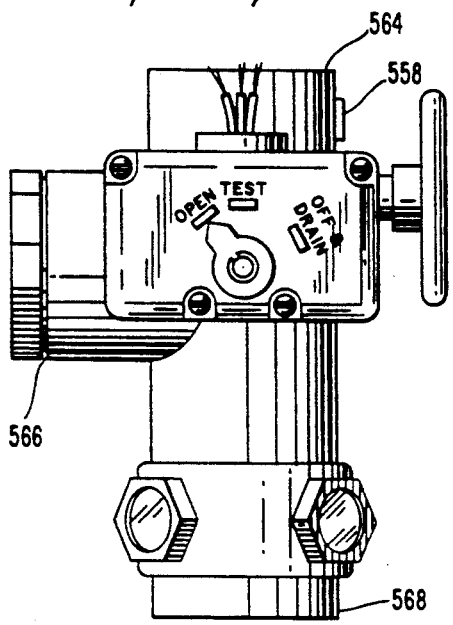
FIG. 58 is a front view of the supply valve of FIG. 57.
Figure 59:
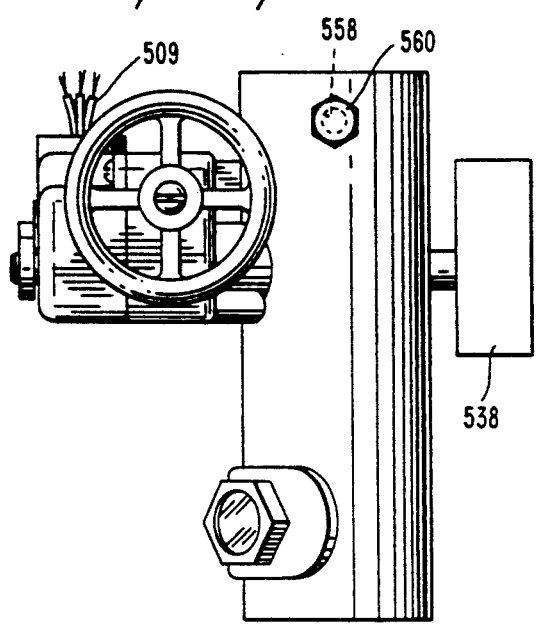
FIG. 59 is a right side view of the supply valve of FIG. 58.
Figure 60:
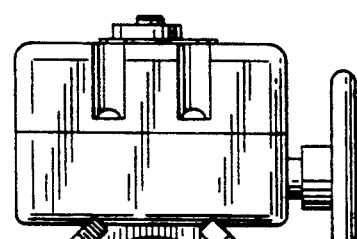
FIG. 60 is a bottom view of the supply valve of FIG. 58.
Figure 61:
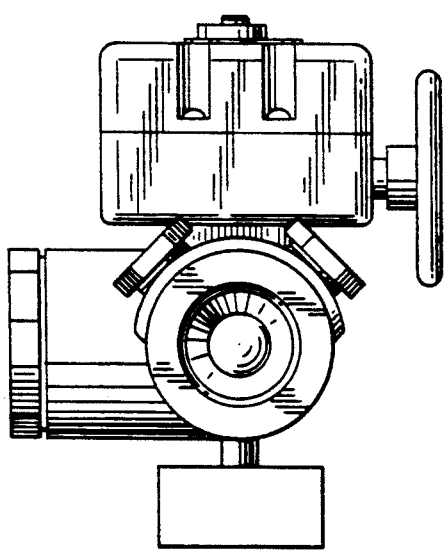
FIG. 61 is a top view of the supply valve of FIG. 58.

With reference now to FIG. 53, the control lever has been rotated clockwise (from the "off" position) through 90 degrees to the "supply" position. With reference to FIG. 54, a clockwise rotation of the ball member 368 through 90 degrees has presented the third port 374 adjacent the first outlet of the valve. Water is then free to flow through the second and third ports from the inlet to the first outlet 352 to supply the water sprinklers with water. Simultaneously, a solid portion of the ball valve member is provided adjacent the seal 390 to maintain the second outlet in a closed configuration. Therefore, in the "supply" configuration, the inlet is in communication with the first outlet but is not in communication with the second outlet.

The valve of FIG. 43 has utility where the supply of water to an arrangement of fire suppression water sprinklers is to be prevented until the event of a fire. For example, it is conventional in naval ships to have an arrangement of fire suppression sprinklers which do not have a meltable member to maintain the sprinklers in a closed configuration until a fire should occur. Instead, the sprinklers are "open" and the supply of water under pressure to the arrangement of water sprinklers is interrupted until necessary, as in the event of a fire.

Therefore, in the valve and arrangement of FIG. 44, the valve would normally be in the "off" configuration. In the event of a fire, the handle would be rotated to the "supply" position to establish communication between the inlet and the arrangement of water sprinklers. When the fire has been extinguished, the handle would be returned to the "off" position.

When it is necessary to test the fire suppression system, the handle is moved to the "test" position and the testing procedure is carried out in the suitable, conventional manner. At the conclusion of the test, the handle is returned to the "off" position. Especially if the valve of FIG. 43 is used in a naval system, it is unnecessary to provide the sight glass arrangement downstream of the second outlet. This is because the second outlet may be directed overboard and the flow of water may be readily observed. Likewise, the need for a pressure gauge in the valve of FIG. 43 for use in a naval system is unlikely.

The valve 348 of FIG. 43 may be oriented as desired so that the first outlet of the valve is directed in whatever direction is most convenient. Typically, the valve is to be oriented with the inlet provided horizontally and with the first outlet extending upwardly. Therefore, although the valve 348 is shown in FIG. 43 to be oriented with the first outlet extending downwardly, it is to be understood that the valve 348 may be made to be oriented in whatever manner is desired. If necessary, the stop plate and the orientation of the handle 360 may be readily reconfigured as appropriate for the orientation of the valve.

With reference now to FIG. 57, another arrangement for supplying, testing and draining a fire suppression water sprinkler system includes a main conduit 30 for supplying water. The conduit 30 supplies a branch conduit 32 by way of a Tee fitting 34. A supply valve 536, according to the present invention, is provided for the branch conduit 32 with the supply valve 536 operable to permit or to interrupt the flow of water through the branch conduit 32.

Integral with the supply valve 536 is provided a water flow switch 538 (see FIG. 62). With reference to FIG. 64, the water flow switch 538 includes a paddle 501 or other member (not shown) which extends into an interior chamber of the housing 562 of the supply valve 536. The paddle 501 preferably has a first portion 502 and a second portion 503 which are joined to one another along a shaft 504. The shaft is received within a threaded housing 505 which is in turn received within a threaded opening 506 in the housing 562. The threaded opening 506 in the housing 562 preferably is provided coaxially with a turning axis of a valve member 584 of the supply valve. In this way, the first portion 502 of the paddle 501 may be deflected by a flow of water through the first outlet 564 and the second portion 503 of the paddle may be deflected by a flow of water through the second outlet 568. The flow sensor includes a contact suitable, conventional contact arrangement such as is disclosed in connection with FIGS. 15, 17, and 19 and the flow sensor is arranged to provide an electrical signal by way of electrical wires 507. Even though the valve has two outlets, it may be appropriate to provide a signal or an alarm whenever there is a flow of water through the valve. Therefore, it may only be necessary to have two wires to provide the electrical signal from the flow sensor. Deflection of the shaft to indicate flow through the first outlet may be used to trigger a fire alarm or to alert a fire department.

In the preferred embodiment, the paddle of the flow sensor is provided centrally within the valve member 582. In this way, a single flow sensor may be used to indicate a flow of water through the first outlet (i.e., in the event of a fire) and may also indicate a flow of water through the second outlet as in a test operation. In this way, the need for the sight glasses may be obviated unless required by local ordinance.

The supply valve has an inlet 566 which is connected to the branch conduit 32 and a first outlet 564 which is connected to a plurality of individual water sprinklers (not shown) . The supply valve 536 also has a second outlet 568 which may be connected to a drain. The supply valve 536 is preferably provided at a location which is physically lower than the portion of the branch conduit 32 downstream of the supply valve 536 and also physically lower than all of the individual water sprinklers and the associated system of supply conduits which are supplied with water by the branch conduit 32. In this way, the entire water sprinkler system downstream of the supply valve 536 may be drained as desired through the second outlet 568 of the supply valve 536.

When it is desired to replace one or more of the individual water sprinklers, the valve 536 is closed and the water sprinkler system is preferably drained through the second outlet 568 of the supply valve 536, so that the removal of one or more of the individual water sprinklers will not result in a flow of water through the fitting for the water sprinkler.

The inlet 566 of the supply valve 536 is threaded onto a section of pipe in the branch conduit 32. Likewise, the first outlet 564 is threaded onto a section of pipe in the arrangement of individual water sprinklers downstream of the supply valve 536. Other arrangements for connecting the inlet of the supply valve 536 to the branch conduit 32 and for connecting the first outlet 564 to the arrangement of individual water sprinklers will be readily obvious to one skilled in the art.

The second outlet 568 of the supply valve 536 may be connected directly to a drain (not shown). Alternatively, the second outlet 568 of the supply valve 536 may be left unconnected. In this way, the flow of water through the second outlet 568 of the supply valve 568 would be visually observed without the use of a sight glass. If, however, no visual inspection of the flow of water is necessary, the second outlet of the supply valve 568 may be connected directly to drain.

The supply valve 568 is provided with a pressure gauge 556 by way of a pressure port 558. The pressure gauge is provided adjacent the first outlet for the supply valve and senses the pressure in the supply valve 536 at the first outlet of the valve. If the pressure gauge 556 is omitted, a plug 560 is threadably received by the pressure port 58 (see FIG. 63).

With reference now to FIG. 63, the housing 562 of the supply valve 536 according to the present invention has three threaded openings 564, 566 and 568 which are coplanar. The first opening 564 and the third opening 568 are colinear with one another and the second opening 566 is perpendicular to the first and the third openings. When in use as in the arrangement of FIG. 57, the middle opening 566 is the inlet of the supply valve and the first opening 564 is the outlet to the arrangement of sprinklers. The third opening 568 is typically connected to a drain as discussed above.

A valve actuator 582 includes a threaded shaft and turn wheel which are rotated to move a valve member 584 (see FIG. 11 and FIG. 12) within the housing 562 of the supply valve 536. The valve actuator is connected to the valve member 584 by way of a gear operator such as is typically found in connection with butterfly valves. Local regulations typically require that the valve member in a supply valve for a fire protection water sprinkler system be unable to move between a closed position and a fully open position in less than a preselected period of time. A suitable, conventional gear operator and valve actuator provides the required time delay in valve member movement so as to prevent the supply valve from being suddenly opened or closed. Such a sudden opening or closing of the supply valve can result in a harmful shock to the water supply system.

The gear operator is also provided with an indicator 508 which moves with the valve member 582. The gear operator housing 509 includes three legends, namely, "open", "test", and "off & drain". The indicator 508 points to the appropriate legend to show the orientation of the valve member within the housing. If desired, the gear operator may also be provided with an electric switch which can indicate the orientation of the valve member to a remote location (as by the electrical wires 509) and may also sound an alarm to indicate that the supply valve has been closed. Suitable, conventional apparatus for moving the valve member and for electrically indicating the orientation of the valve member is provided by the Milwaukee Valve Company, Inc. of Milwaukee, Wis. in connection with a Butterball "slow-close" butterfly valve.

With reference now to FIG. 63, the supply valve 536 includes the valve member or ball member 584 which is received within the interior chamber of the housing 562 of the supply valve. In the valve 536 of the preferred embodiment, the housing is configured so as to receive the ball member 84 through the middle opening 566. The ball member 584 is carried by an annular seat 586 and an annular seal 586' which have an inner surface 588 that conforms to the spherical shape of the ball member 584.

The seat and the seal are provided on either side of the ball valve member and a threaded retainer 587 which forms the inlet 566 for the supply valve releasably maintains the ball member and associated seat and seal within the interior chamber of the housing. The retainer and one or more of the threaded openings 564, 566, 568 are provided with a hexagonal peripheral surface so as to facilitate assembly and disassembly of the supply valve 536.

With reference to FIG. 63, the second outlet is also provided with a seal 586" which is used to seal the second outlet when the valve is in the "open" configuration. In the "open" configuration, communication is provided between the inlet and the first outlet but communication is blocked between the second outlet and both the inlet and the first outlet. The seal 586" may be of a reduced diameter and is received on a shoulder of the second outlet so as not to interfere with the seat 586 and the seal 568'. Alternatively, the seat 586, the seal 586' and the seal 586" may be made as an integral member which is provided about the ball valve prior to insertion through the inlet opening 566. It is only necessary that the second outlet be substantially closed when the valve is in the "open" and in the "off & drain" configurations since any leakage through the second outlet will be directed away to the drain.

In addition, the ball and valve housing may be configured in an oversize manner so that sufficient space is provided for the separate seals 586' and 586" In such an arrangement, the size of the second and third ports on the periphery of the ball valve member will have the same actual size but since the ball member itself is oversized, the spacing between the first, second and third ports on the periphery of the ball valve member will be increased. With the increased spacing between the ports, separate seals can be readily accommodated at the inlet and at the second outlet to provide a reliable sealing arrangement although the overall cost of the valve will be increased due to the oversized housing and oversized ball valve member. In such an oversized arrangement, the rate of flow though the valve from the inlet to the first outlet, from the inlet to the second outlet and from the first outlet to the second outlet in the "supply", "test", and "off & drain" configurations is determined based upon the size of the supply conduit, the arrangement of water sprinklers downstream of the first outlet and by the size of the sprinklers themselves.

With reference again to FIG. 64, the ball member 584 is provided with a slot 598 which is adapted to receive a lowermost tab 600 of a stem 602. The stem is inserted into the valve housing 562 through an opening 603 which is perpendicular to the openings 564, 566, 568. The stem 602 is rotated by the gear operator 509. The housing 511 for the gear operator is releasably mounted on the supply valve housing by a plurality of screws 512 which pass through the housing of the gear operator and which are in turn received by the supply valve housing. Suitable packing may be provided for the stem 602 as desired.

With reference to FIG. 64, the ball member 584 is provided with a first port 624 having a cross-sectional area corresponding to the opening provided by one of the individual sprinklers in the fire suppression water sprinkler system. The first port 624 communicates with the second and third ports 626, 628 provided in the ball member 584. The second and third ports 626, 628 have a cross-sectional area which is relatively large in comparison with the first port 624 so that the second and third ports can quickly supply water to the arrangement of sprinklers in the event of a fire.

While the preferred embodiments as described in the present application include a spherical shaped valve member having a relatively thin wall construction which may be cast or machined as appropriate, the present invention may be adaptable to other suitable, conventional valve configurations. For example, with reference to FIG. 65, a solid ball valve member 584' according to the present invention includes first, second and third ports 624, 626, and 628. The ports may be provided in the solid ball member in any suitable, conventional manner as by drilling. The solid ball member 584' is completely interchangeable with the thin-walled ball member of FIG. 64 and only differs in its internal construction. The solid ball member weighs more and may therefore be more costly to manufacture. However, the solid ball may be manufactured more readily, at least in relatively small quantities.

Other valve arrangements are also within the scope of the claims. For example, a plug valve (not shown) wherein the valve member comprises a truncated cone may be modified in accordance with the present invention by providing first, second and third ports in the valve member in the manner disclosed above.

Figure 67:
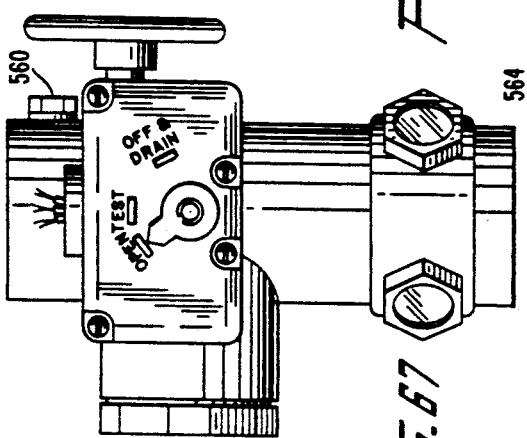
FIG. 67 is a front view of the supply valve of FIG. 57 with the valve member in the open position.
Figure 68:
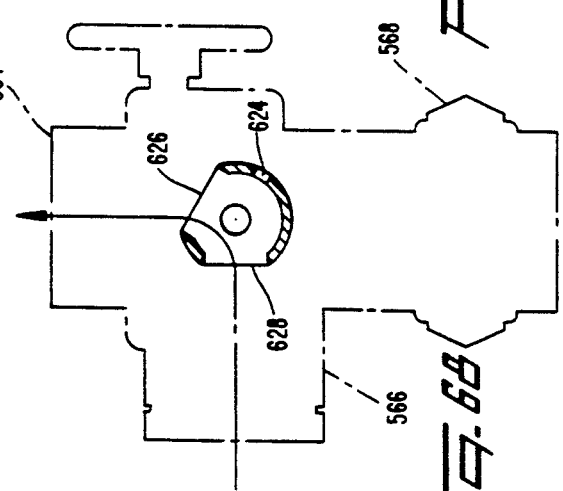
FIG. 68 is a schematic view of the supply valve of FIG. 67 in partial cross-section.

With reference now to FIG. 67, the supply valve 536 has the indicator 508 in the "open" position. The ball member is positioned by the gear operator so that a solid portion of the spherical outer surface of the ball member is oriented toward the second outlet 568 of the supply valve. With reference to FIG. 68, the third port 628 is positioned adjacent the inlet 566 of the supply valve with the second port 626 positioned adjacent the first outlet 564. A solid portion of the ball member is positioned adjacent the second outlet 568. Accordingly, water is permitted to flow through the inlet 566 to the first outlet 564 at the first preselected flow rate (the fully open flow rate). Water is not permitted to flow through the ball member from the inlet of the valve to the second outlet 568.

A flow of water through the first outlet will provide a torque about the shaft of the flow sensor which will in turn cause the flow sensor to provide a signal to indicate the flow through the first outlet. After the system has been fully supplied with water and is in a static configuration, the flow of water from the inlet to the first outlet will indicate that at least one of the sprinklers has opened, typically as a result of a fire.

Figure 69:
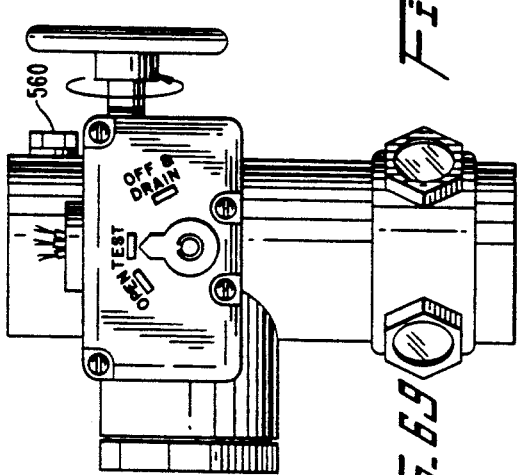
FIG. 69 is a front view of the supply valve of FIG. 57 with the valve member in the test position.
Figure 70:
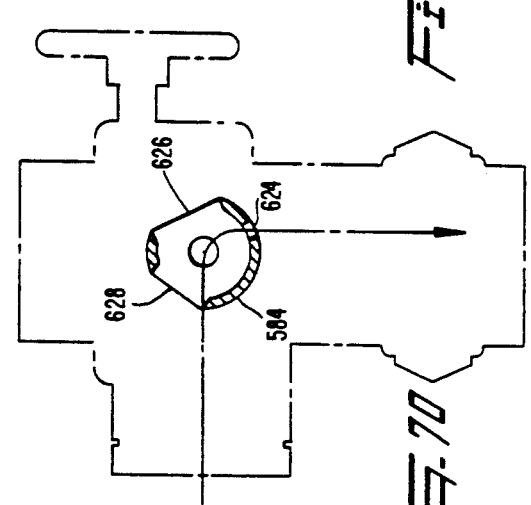
FIG. 70 is a schematic view of the supply valve of FIG. 69 in partial cross-section.

With reference now to FIG. 69, the gear operator has been moved and the indicator now points to the "test" position. With reference to FIG. 70, the ball member 582 has been rotated clockwise sufficiently to permit the first port 624 of the ball member to provide communication between the inlet 566 and the second outlet 568. Water is therefore free to flow through the relatively small opening of the first port through the second port and then through the outlet of the valve. At this time communication (albeit somewhat restricted) is still provided between the inlet and the first opening 564. This communication permits the pressure in the system to be sensed by the pressure gauge, if provided, at the first outlet during a test operation. A flow of water through the second outlet during the test operation will provide a torque about the shaft of the flow sensor which will in turn cause the flow sensor to provide a signal to indicate the flow through the second outlet.

Figure 71:
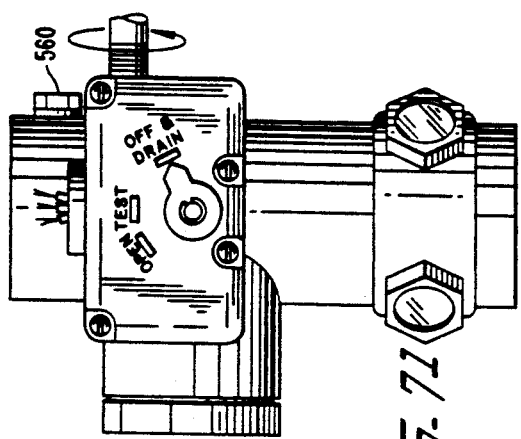
FIG. 71 is a front view of the supply valve of FIG. 57 with the valve member in the off & drain position.
Figure 72:
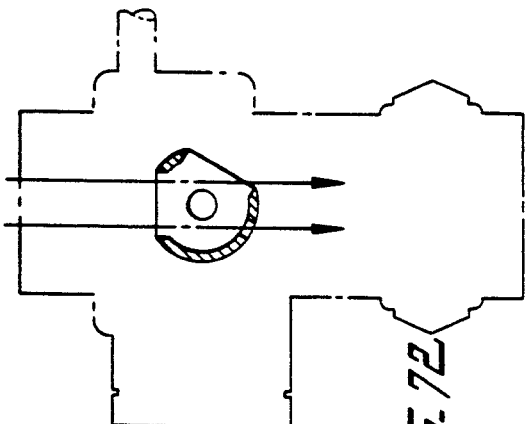
FIG. 72 is a schematic view of the supply valve of FIG. 71 in partial cross-section.

With reference now to FIG. 71, the gear operator has again been moved to rotate the ball member further in a clockwise direction. The indicator now points to the "off & drain" legend. With reference to FIG. 72, a clockwise rotation of the ball member 584 has presented the first port 624 and a portion of the second port 626 adjacent the second outlet of the supply valve. A solid portion of the ball member is provided adjacent the inlet 566 of the supply valve to interrupt the supply of water. Water is then free to flow through the second and third ports from the inlet to the outlet of the valve.

Figure 73:
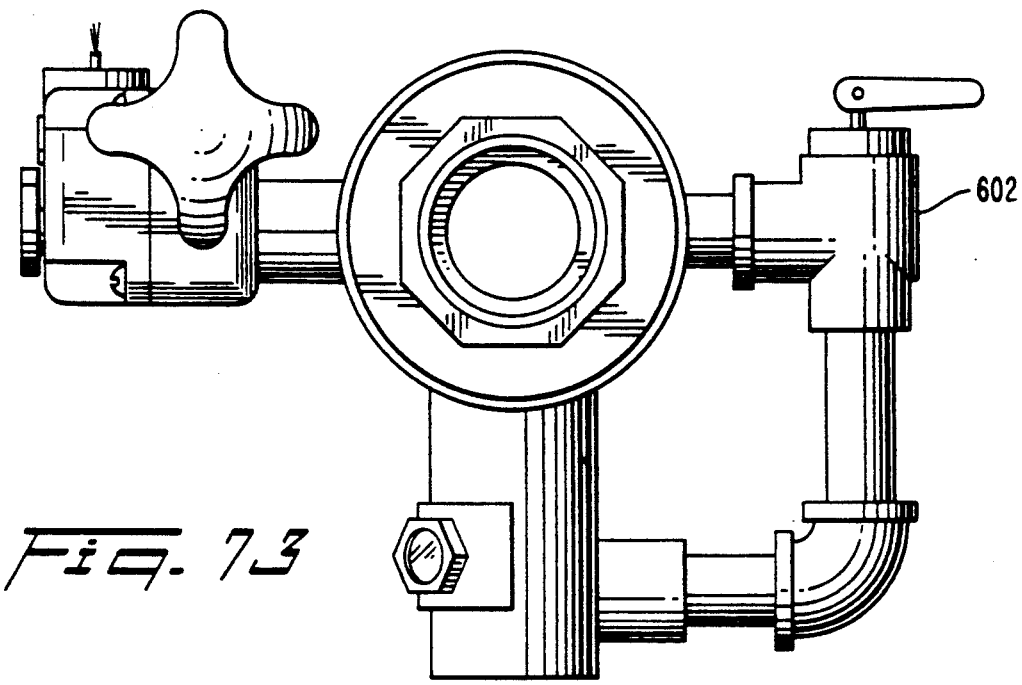
FIG. 73 is an end view of the valve of FIG. 5 provided with a pressure relief valve.

With reference now to FIG. 73, the supply valve of FIG. 1 is provided with a pressure relief valve 602 of suitable, conventional design. The pressure relief valve may be provided in the port provided for the flow switch in the embodiment of FIG. 2. If the flow switch is desired to be provided in the valve as described above, the pressure relief valve may be provided elsewhere so as to be in communication with the interior of the valve housing. Preferably, the pressure relief valve includes suitable piping so as to direct any flow through the pressure relief valve to the drain of the second outlet.

Figure 74:
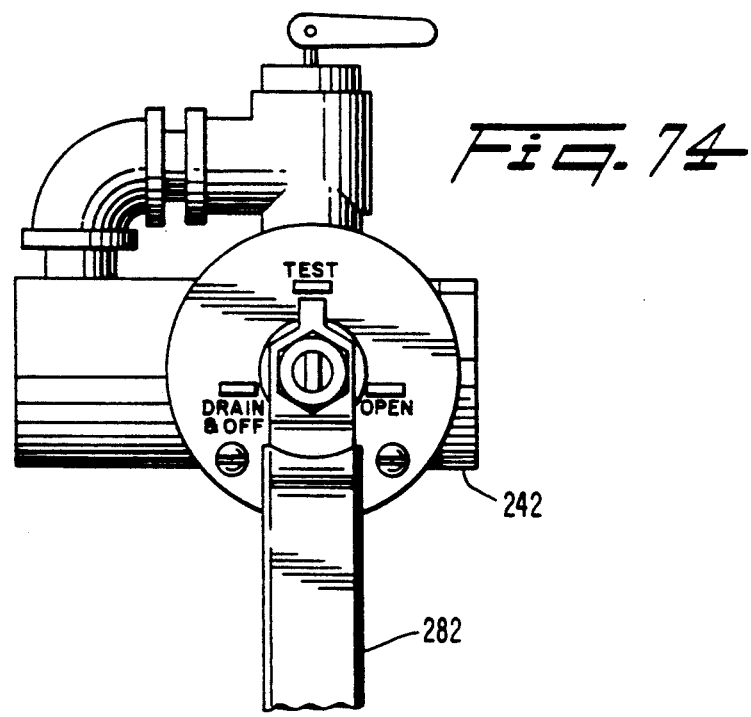
FIG. 74 is a front view of the valve of FIG. 34 provided with a pressure relief valve.
Figure 75:
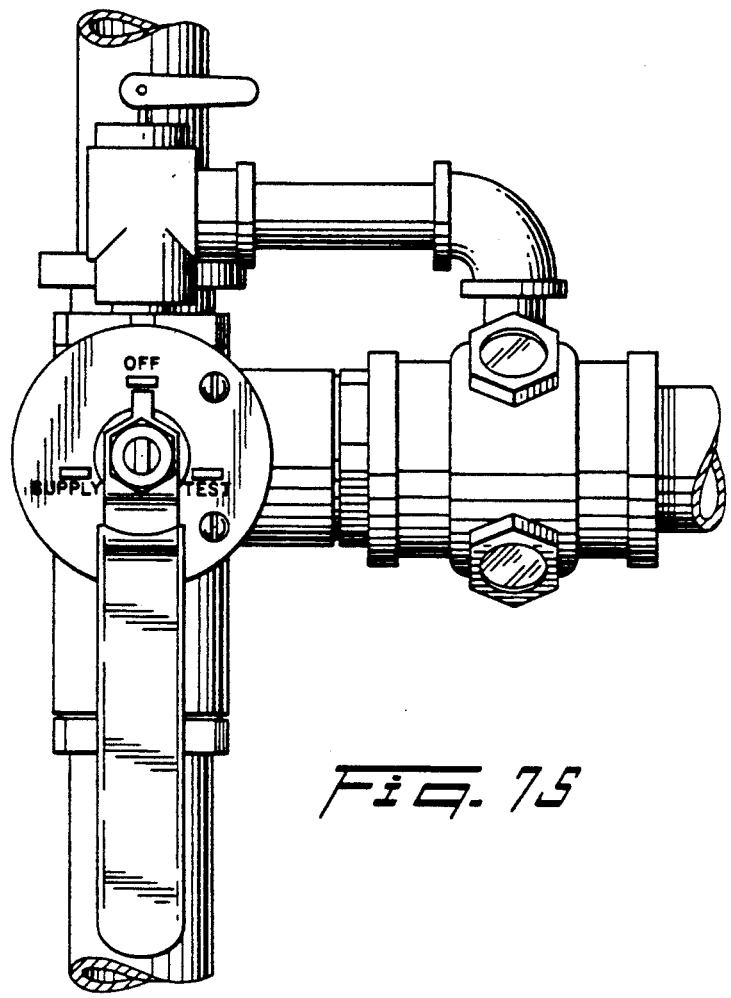
FIG. 75 is a front view of the valve of FIG. 43 provided with a pressure relief valve.
Figure 76:
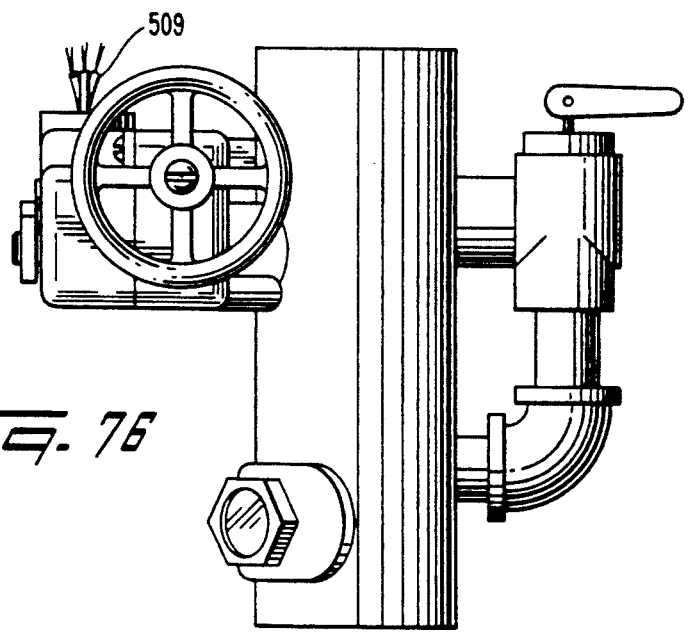
FIG. 76 is a front view of the valve of FIG. 57 provided with a pressure relief valve.

Similarly, with reference to FIGS. 74, 75, and 76 a pressure relief valve 602 may be provided for each of the supply valves of FIGS. 34, 43, and 57. The pressure relief valves are provided so as to communicate with an interior of the valve housings and preferably are arranged so as to direct any flow through the pressure relief valves to the second outlet of the valves.

While the various valves and arrangements according to the present invention have been described with reference to a fire suppression water sprinkler system, it is expected that the various valves and arrangements may be of general utility in systems other than water sprinkler systems. Accordingly, the principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, be embraced thereby.

What is claimed is:

1. An arrangement for supplying, testing and draining a fire suppression water sprinkler system, comprising:
    conduit means for supplying water to a plurality of sprinklers;
    supply valve means for selectively opening and closing said conduit means, said supply valve means comprising
    a housing defining an interior chamber having an inlet and first and second outlets, said inlet being in fluid communication with said conduit means and said first outlet being in fluid communication with said plurality of sprinklers,
    a valve member provided within said interior chamber, the valve member having at least first, second and third ports, said first port having a size which is different than at least one of the second and third ports, and
    means for selectively moving said valve member within said interior chamber whereby communication between said inlet and said first outlet may be provided at a first predetermined amount, communication between said inlet and said second outlet may be provided at a second predetermined amount less than the first predetermined amount, and wherein communication between the inlet and the first and second outlets may be interrupted.

2. The arrangement of claim 1, further comprising means for sensing a flow of water in said conduit means.

3. The arrangement of claim 2 wherein said means for sensing is provided within said valve housing.

4. The arrangement of claim 3 wherein said means for sensing includes a member to be deflected by said flow of water and wherein said member to be deflected is provided within said valve member.

5. The arrangement of claim 4 wherein said means for sensing is arranged to sense a flow though the first outlet and to provide an indication characteristic thereof and is also arranged to sense a flow through the second outlet and to provide an indication characteristic thereof.

6. The arrangement of claim 1, wherein the first, second and third ports are arranged about a circumference of said valve member and wherein the inlet, the first outlet, and the second outlet are coplanar.

7. The arrangement of claim 6, wherein the inlet and the first outlet of the housing are colinear and wherein the second outlet is perpendicular to the inlet and the first outlet, wherein said valve member may be sequentially moved to provide communication between the inlet and the first outlet at the first preselected flow rate with communication between the inlet and the second outlet blocked, then to provide communication between the inlet and the second outlet at said second preselected flow rate, then to block communication between the inlet and the first and second outlets and to provide communication between the first and second outlets.

8. The arrangement of claim 6, further comprising means for sensing a flow of water in said conduit means, said means for sensing being provided within said valve housing, said means for sensing includes a member to be deflected by said flow of water and wherein said member to be deflected is provided within said valve member.

9. The arrangement of claim 6 wherein said valve member is spherical.

10. The arrangement of claim 9 wherein said valve member is thin walled.

11. The arrangement of claim 6 wherein said means for selectively moving said valve member includes means for limiting the speed at which the valve member may be moved.

12. The arrangement of claim 11 further comprising means for indicating the position of the valve member.

13. The arrangement of claim 12 wherein said means for indicating the position of the valve member provides a signal when the supply valve is in other than a fully open configuration.

14. The arrangement of claim 7 further comprising sight glass means for permitting a visual observation of flow through said second outlet.

15. The arrangement of claim 7 further comprising pressure relief means for relieving a pressure in said housing above a predetermined pressure, said pressure relief means including a pressure relief outlet in communication with said second outlet of the valve housing.

16. The arrangement of claim 6, wherein the inlet and the first outlet of the housing are colinear and wherein the second outlet is perpendicular to the inlet and the first outlet, wherein said valve member may be sequentially moved to provide communication between the inlet and the first outlet at the first preselected flow rate with communication between the inlet and the second outlet blocked, then to provide communication between the inlet and the second outlet at said second preselected flow rate, then to block communication between the inlet and the first and second outlets and to block communication between the first and second outlets.

17. The arrangement of claim 6, wherein the inlet and the first outlet of the housing are colinear and wherein the second outlet is perpendicular to the inlet and the first outlet, wherein said valve member may be sequentially moved to provide communication between the inlet and the first outlet at the first preselected flow rate with communication between the inlet and the second outlet blocked, then to provide communication between the inlet and the second outlet at said second preselected flow rate, then to block communication between the inlet and the first and second outlets and to provide communication between the first and second outlets, then to block communication between the inlet and the first and second outlets and to block communication between the first outlet and the second outlet.

18. The arrangement of claim 1, wherein the valve member further includes a fourth port, three of said ports being coplanar with one another and the other port being perpendicular to the plane of the other three ports, said three ports which are coplanar being arranged with two of said ports colinear and the other port being perpendicular to the other two ports, said inlet and said first and second outlets of the housing being coplanar.

19. The arrangement of claim 18 wherein one of said four ports is colinear with an axis of rotation of the valve member and wherein said first outlet is colinear with the axis of rotation of the valve member, whereby communication between the inlet and the first outlet may be provided at the first preselected flow rate with communication between the inlet and the second outlet being blocked, communication may be provided between the inlet and the second outlet at the second preselected flow rate, and communication may be blocked between the inlet and the first and second outlets with communication provided between the first and second outlets.

20. The arrangement of claim 19, further comprising means for sensing a flow of water in said conduit means, said means for sensing being provided within said valve housing, said means for sensing includes a member to be deflected by said flow of water and wherein said member to be deflected is provided within said valve member.

21. The arrangement of claim 19 wherein said valve member is spherical.

22. The arrangement of claim 21 wherein said valve member is thin walled.

23. The arrangement of claim 19 wherein said means for selectively moving said valve member includes means for limiting the speed at which the valve member may be moved.

24. The arrangement of claim 23 further comprising means for indicating the position of the valve member.

25. The arrangement of claim 24 wherein said means for indicating the position of the valve member provides a signal when the supply valve is in other than a fully open configuration.

26. The arrangement of claim 23 further comprising sight glass means for permitting a visual observation of flow through said second outlet.

27. The arrangement of claim 19 further comprising pressure relief means for relieving a pressure in said housing above a predetermined pressure, said pressure relief means including a pressure relief outlet in communication with said second outlet of the valve housing.

28. The arrangement of claim 1, wherein the first, second and third ports are oriented perpendicular to one another and wherein the inlet, the first outlet, and the second outlet are perpendicular to one another.

29. The arrangement of claim 28, wherein said valve member may be moved to block communication between the inlet and the first and the second outlets, to provide communication between the inlet and the first outlet at the first preselected flow rate with communication between the inlet and the second outlet blocked, and to provide communication between the inlet and the second outlet at said second preselected flow rate with communication between the inlet and the first outlet blocked.

30. The arrangement of claim 29 wherein said valve member is spherical.

31. The arrangement of claim 30 wherein said valve member is thin walled.

32. The arrangement of claim 30 further comprising pressure relief means for relieving a pressure in said housing above a predetermined pressure, said pressure relief means including a pressure relief outlet in communication with said second outlet of the valve housing.

33. The arrangement of claim 1, wherein the first, second and third ports are arranged about a circumference of said valve member and wherein the inlet, the first outlet, and the second outlet are coplanar, wherein the first outlet and the second outlet of the housing are colinear and wherein the inlet is perpendicular to the first outlet and the second outlet, wherein said valve member may be sequentially moved to provide communication between the inlet and the first outlet at the first preselected flow rate with communication between the inlet and the second outlet blocked, then to provide communication between the inlet and the second outlet at said second preselected flow rate, then to block communication between the inlet and the first and second outlets and to provide communication between the first and second outlets.

34. The arrangement of claim 33, further comprising means for sensing a flow of water in said conduit means, said means for sensing being provided within said valve housing, said means for sensing includes a member to be deflected by said flow of water and wherein said member to be deflected is provided within said valve member.

35. The arrangement of claim 33 wherein said valve member is spherical.

36. The arrangement of claim 35 wherein said valve member is thin walled.

37. The arrangement of claim 33 wherein said means for selectively moving said valve member includes means for limiting the speed at which the valve member may be moved.

38. The arrangement of claim 37 further comprising means for indicating the position of the valve member.

39. The arrangement of claim 38 wherein said means for indicating the position of the valve member provides a signal when the supply valve is in other than a fully open configuration.

40. The arrangement of claim 34 further comprising sight glass means for permitting a visual observation of flow through said second outlet.

41. The arrangement of claim 33 further comprising pressure relief means for relieving a pressure in said housing above a predetermined pressure, said pressure relief means including a pressure relief outlet in communication with said second outlet of the valve housing.

42. A valve, comprising:
a housing defining an interior chamber having an inlet and first and second outlets,
a valve member provided within said interior chamber, the valve member having at least first, second and third ports, said first port having a size which is different than at least one of the second and third ports, and
means for selectively moving said valve member within said interior chamber whereby communication between said inlet and said first outlet may be provided at a first predetermined amount, communication between said inlet and said second outlet may be provided at a second predetermined amount less than the first predetermined amount, and wherein communication between the inlet and the first and second outlets may be interrupted while communication is provided between the first and second outlets.

43. The valve of claim 42, further comprising means for sensing a flow of water in said valve.

44. The valve of claim 43 wherein said means for sensing is provided within said valve housing.

45. The valve of claim 44 wherein said means for sensing includes a member to be deflected by said flow of water and wherein said member to be deflected is provided within said valve chamber.

46. The valve of claim 45 wherein said means for sensing is arranged to sense a flow through the first outlet and to provide an indication characteristic thereof and is also arranged to sense a flow through the second outlet and to provide an indication characteristic thereof.

47. The valve of claim 42, wherein the first, second and third ports are arranged about a circumference of said valve member and wherein the inlet, the first outlet, and the second outlet are coplanar.

48. The valve of claim 47 wherein said means for selectively moving said valve member includes means for limiting the speed at which the valve member may be moved.

49. The valve of claim 48 further comprising means for indicating the position of the valve member.

50. The valve of claim 49 wherein said means for indicating the position of the valve member provides a signal when the supply valve is in other than a fully open configuration.

51. A valve comprising:
a housing defining an interior chamber having an inlet and first and second outlets,
a valve member provided within said interior chamber, the valve member having at least first, second and third ports, said first port having a size which is different than at least one of the second and third ports, said first, second and third ports being arranged about a circumference of said valve member and said inlet, said first outlet, and said second outlet being coplanar, and
means for selectively moving said valve member within said interior chamber whereby communication between said inlet and said first outlet may be provided at a first predetermined amount, communication between said inlet and said second outlet may be provided at a second predetermined amount less than the first predetermined amount, and wherein communication between the inlet and the first and second outlets may be interrupted, said inlet and said first outlet of the housing being colinear and said second outlet being perpendicular to the inlet and the first outlet, wherein said valve member may be sequentially moved to provide communication between the inlet and the first outlet at the first preselected flow rate with communication between the inlet and the second outlet blocked, then to provided communication between the inlet and the second outlet at said second preselected flow rate, then to block communication between the inlet and the first and second outlets and to provide communication between the first and second outlets.

52. The valve of claim 51, further comprising means for sensing a flow of water in said valve, said means for sensing being provided within said valve housing, said means for sensing includes a member to be deflected by said flow of water and wherein said member to be deflected is provided within said valve member.

53. The valve of claim 51 wherein said flow member is spherical.

54. The valve of claim 53 wherein said valve member is thin walled.

55. The valve of claim 51 further comprising sight glass means for permitting a visual observation of flow through said second outlet.

56. The valve of claim 48 further comprising pressure relief means for relieving a pressure in said housing above a predetermined pressure, said pressure relief means including a pressure relief outlet in communication with said second outlet of the valve housing.

57. A valve comprising:
a housing defining an interior chamber having an inlet and first and second outlets,
a valve member provided within said interior chamber, the valve member having at least first, second and third ports, said first port having a size which is different than at least one of the second and third ports, said first, second and third ports being arranged about a circumference of said valve member and said inlet, said first outlet, and said second outlet being coplanar, and
means for selectively moving said valve member within said interior chamber whereby communication between said inlet and said first outlet may be provided at a first predetermined amount, communication between said inlet and said second outlet may be provided at a second predetermined amount less than the first predetermined amount, and wherein communication between the inlet and the first and second outlets may be interrupted, said inlet and said first outlet of the housing being colinear and said second outlet being perpendicular to the inlet and the first outlet, wherein said valve member may be sequentially moved to provide communication between the inlet and the first outlet at the first preselected flow rate with communication between the inlet and the second outlet blocked, then to provided communication between the inlet and the second outlet at said second preselected flow rate, then to block communication between the inlet and the first and second outlets and to provide communication between the first and second outlets.

58. A valve comprising:
a housing defining an interior chamber having an inlet and first and second outlets,
a valve member provided within said interior chamber, the valve member having at least first, second and third ports, said first port having a size which is different than at least one of the second and third ports, said first, second and third ports being arranged about a circumference of said valve member and said inlet, said first outlet, and said second outlet being coplanar, and
means for selectively moving said valve member within said interior chamber whereby communication between said inlet and said first outlet may be provided at a first predetermined amount, communication between said inlet and said second outlet may be provided at a second predetermined amount less than the first predetermined amount, and wherein communication between the inlet and the first and second outlets may be interrupted, said inlet and said first outlet of the housing being colinear and said second outlet being perpendicular to the inlet and the first outlet, wherein said valve member may be sequentially moved to provide communication between the inlet and the first outlet at the first preselected flow rate with communication between the inlet and the second outlet blocked, then to provided communication between the inlet and the second outlet at said second preselected flow rate, then to block communication between the inlet and the first and second outlets and to provide communication between the first and second outlets, then to block communication between the inlet and the first and second outlets and to block communication between the first outlet and the second outlet.

59. A valve comprising:
a housing defining an interior chamber having an inlet and first and second outlets,
a valve member provided within said interior chamber, the valve member having at least first, second and third ports, said first port having a size which is different than at least one of the second and third ports, and
means for selectively moving said valve member within said interior chamber whereby communication between said inlet and said first outlet may be provided at a first predetermined amount, communication between said inlet and said second outlet may be provided at a second predetermined amount less than the first predetermined amount, and wherein communication between the inlet and the first and second outlets may be interrupted, said valve member further including a fourth port, three of said ports being coplanar with one another and the other port being perpendicular to the plane of the other three ports, said three ports which are coplanar being arranged with two of said ports colinear and the other port being perpendicular to the other two ports, said inlet and said first and second outlets of the housing being coplanar.

60. The valve of claim 59 wherein one of said four ports is colinear with an axis of rotation of the valve member and wherein said first outlet is colinear with the axis of rotation of the valve member, whereby communication between the inlet and the first outlet may be provided at the first preselected flow rate with communication between the inlet and the second outlet being blocked, communication may be provided between the inlet and the second outlet at the second preselected flow rate, and communication may be blocked between the inlet and the first and second outlets with communication provided between the first and second outlets.

61. The valve of claim 60, further comprising means for sensing a flow of water in said conduit means, said means for sensing being provided within said valve housing, said means for sensing includes a member to be deflected by said flow of water and wherein said member to be deflected is provided within said valve member.

62. The valve of claim 60 wherein said valve member is spherical.

63. The valve of claim 62 wherein said valve member is thin walled.

64. The valve of claim 60 wherein said means for selectively moving said valve member includes means for limiting the speed at which the valve member may be moved.

65. The valve of claim 64 further comprising means for indicating the position of the valve member.

66. The valve of claim 65 wherein said means for indicating the position of the valve member provides a signal when the supply valve is in other than a fully open configuration.

67. The valve of claim 64 further comprising sight glass means for permitting a visual observation of flow through said second outlet.

68. The valve of claim 60 further comprising pressure relief means for relieving a pressure in said housing above a predetermined pressure, said pressure relief means including a pressure relief outlet in communication with said second outlet of the valve housing.

69. A valve comprising:
a housing defining an interior chamber having an inlet and first and second outlets,
a valve member provided within said interior chamber, the valve member having at least first, second and third ports, said first port having a size which is different than at least one of the second and third ports, and
means for selectively moving said valve member within said interior chamber whereby communication between said inlet and said first outlet may be provided at a first predetermined amount, communication between said inlet and said second outlet may be provided at a second predetermined amount less than the first predetermined amount, and wherein communication between the inlet and the first and second outlets may be interrupted, said first, second and third ports being oriented perpendicular to one another and wherein the inlet, the first outlet, and the second outlet are perpendicular to one another.

70. The valve of claim 69, wherein said valve member may be moved to block communication between the inlet and the first and the second outlets, to provide communication between the inlet and the first outlet at the first preselected flow rate with communication between the inlet and the second outlet blocked, and to provide communication between the inlet and the second outlet at said second preselected flow rate with communication between the inlet and the first outlet blocked.

71. The valve of claim 70 wherein said valve member is spherical.

72. The valve of claim 71 wherein said valve member is thin walled.

73. The valve of claim 71 further comprising pressure relief means for relieving a pressure in said housing above a predetermined pressure, said pressure relief means including a pressure relief outlet in communication with said second outlet of the valve housing.

74. A valve comprising:
a housing defining an interior chamber having an inlet and first and second outlets,
a valve member provided within said interior chamber, the valve member having at least first, second and third ports, said first port having a size which is different than at least one of the second and third ports, and
means for selectively moving said valve member within said interior chamber whereby communication between said inlet and said first outlet may be provided at a first predetermined amount, communication between said inlet and said second outlet may be provided at a second predetermined amount less than the first predetermined amount, and wherein communication between the inlet and the first and second outlets may be interrupted, said first, second and third ports being arranged about a circumference of said valve member and wherein the inlet, the first outlet, and the second outlet are coplanar, wherein the first outlet and the second outlet of the housing are colinear and wherein the inlet is perpendicular to the first outlet and the second outlet, wherein said valve member may be sequentially moved to provide communication between the inlet and the first outlet at the first preselected flow rate with communication between the inlet and the second outlet blocked, then to provide communication between the inlet and the second outlet at said second preselected flow rate, then to block communication between the inlet and the first and second outlets and to provide communication between the first and second outlets.

75. The valve of claim 74, further comprising means for sensing a flow of water in said conduit means, said means for sensing being provided within said valve housing, said means for sensing includes a member to be deflected by said flow of water and wherein said member to be deflected is provided within said valve member.

76. The valve of claim 74 wherein said valve member is spherical.

77. The valve of claim 76 wherein said valve member is thin walled.

78. The valve of claim 74 wherein said means for selectively moving said valve member includes means for limiting the speed at which the valve member may be moved.

79. The valve of claim 78 further comprising means for indicating the position of the valve member.

80. The valve of claim 79 wherein said means for indicating the position of the valve member provides a signal when the supply valve is in other than a fully open configuration.

81. The valve of claim 75 further comprising sight glass means for permitting a visual observation of flow through said second outlet.

82. The valve of claim 74 further comprising pressure relief means for relieving a pressure in said housing above a predetermined pressure, said pressure relief means including a pressure relief outlet in communication with said second outlet of the valve housing.

* * * * *